United States Patent
Popescu et al.

(10) Patent No.: US 11,838,967 B2
(45) Date of Patent: Dec. 5, 2023

(54) AUTOMATIC DISCOVERY OF ENODEB (ENB) PROXY FOR EN-DC CONFIGURATION TRANSFER

(71) Applicant: Telefonaktiebolaget LM Ericsson (publ), Stockholm (SE)

(72) Inventors: Maximilian Popescu, Skärblacka (SE); Peter Werner, Linköping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 298 days.

(21) Appl. No.: 17/276,988

(22) PCT Filed: Oct. 7, 2019

(86) PCT No.: PCT/SE2019/050974
§ 371 (c)(1),
(2) Date: Mar. 17, 2021

(87) PCT Pub. No.: WO2020/076224
PCT Pub. Date: Apr. 16, 2020

(65) Prior Publication Data
US 2022/0030649 A1 Jan. 27, 2022

Related U.S. Application Data
(60) Provisional application No. 62/743,845, filed on Oct. 10, 2018.

(51) Int. Cl.
*H04W 76/15* (2018.01)
*H04L 29/12* (2006.01)
(Continued)

(52) U.S. Cl.
CPC ......... *H04W 76/15* (2018.02); *H04L 61/4511* (2022.05); *H04W 92/20* (2013.01)

(58) Field of Classification Search
None
See application file for complete search history.

(56) References Cited

U.S. PATENT DOCUMENTS

2016/0212775 A1* 7/2016 Xu .................. H04W 76/10
2019/0261231 A1* 8/2019 Sivavakeesar .... H04W 36/0066

FOREIGN PATENT DOCUMENTS

EP 2699049 A1 2/2014

OTHER PUBLICATIONS

"3GPP TS 36.423 V15.2.0", 3rd Generation Partnership Project; Technical Specification Group Radio Access Network; Evolved Universal Terrestrial Radio Access Network (E-UTRAN); X2 application protocol (X2AP) (Release 15), Jun. 2018, pp. 1-389.
(Continued)

*Primary Examiner* — Hong Shao
(74) *Attorney, Agent, or Firm* — Murphy, Bilak & Homiller, PLLC

(57) ABSTRACT

Embodiments include methods for configuring a first node of a first radio access technology (RAT) in a radio access network (RAN), for dual connectivity toward a user equipment with nodes of a second RAT in the RAN. Such methods include receiving, from a DNS server, an address of a first node of the second RAT, which is configured to act as an address request proxy for nodes of the first RAT. Such methods include, based on the received address, establishing a first connection with the first node of the second RAT. Such methods also include receiving a third request to set up a second connection with a second node of the second RAT, and sending, to the second node a fourth request, to the second node (e.g., in response to the third request), for the second node to act as address request proxy for the first node of the first RAT.

22 Claims, 17 Drawing Sheets

(51) Int. Cl.
*H04L 61/4511* (2022.01)
*H04W 92/20* (2009.01)

(56) References Cited

OTHER PUBLICATIONS

"3GPP TS 37.340 V15.3.0", 3rd Generation Partnership Project; Technical Specification Group Radio Access Network; Evolved Universal Terrestrial Radio Access (E-UTRA) and NR; Multi-connectivity; Stage 2 (Release 15), Sep. 2018, 1-59.
"3GPP TS 38.423 V15.1.0", 3rd Generation Partnership Project; Technical Specification Group Radio Access Network; NG-RAN; Xn application protocol (XnAP) (Release 15), Sep. 2018, pp. 1-263.
"Further details on TNL address discovery for option 3", 3GPP TSG-RAN WG3 Meeting #97; R3-172727; Berlin, Germany, Aug. 21-25, 2017, pp. 1-4.
"Introducing X2 TNL Address discovery for en-gNBs for EN-DC", 3GPP TSG-RAN WG3 Meeting #101; R3-185000; Gothenburg, Sweden, Aug. 20-24, 2018, pp. 1-14.
"TNL address discovery based on intermediate node", 3GPP TSG-RAN WG3 Meeting #97bis; R3-173753; Prague, Czech Republic, Oct. 9-13, 2017, pp. 1-2.
"3GPP TS 36.300 V15.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Jun. 2018, pp. 1-357.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"Introducing X2 TNL Address discovery for en-gNBs for EN-DC", 3GPP TSG-RAN WG3 Meeting #101bis, R3-185914, Chengdu, P.R. China, Oct. 8-12, 2018, pp. 1-15.

* cited by examiner

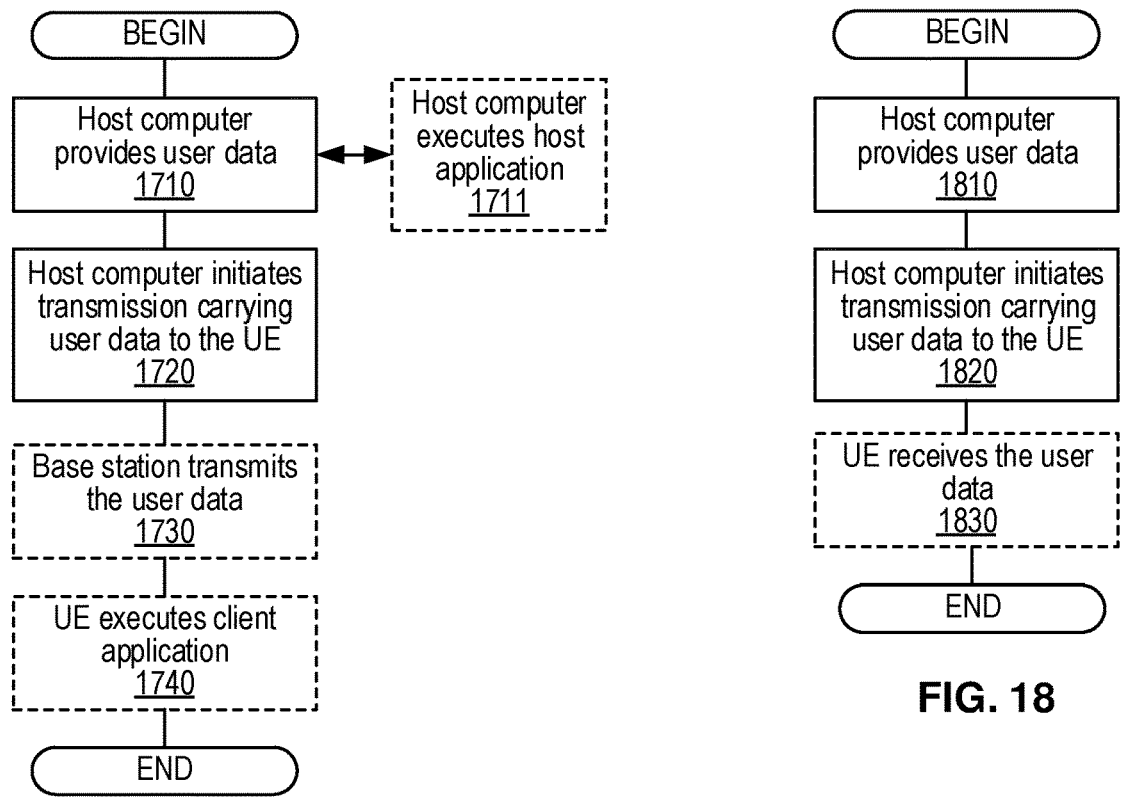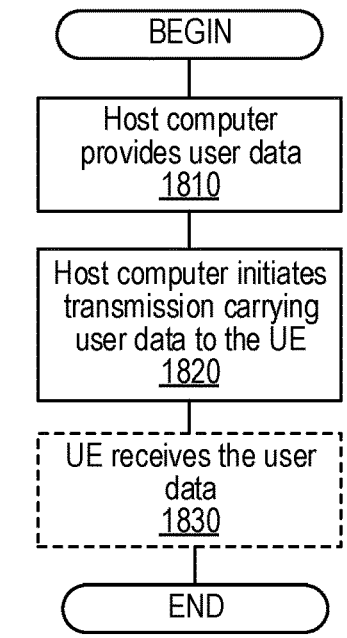
FIG. 17
FIG. 18
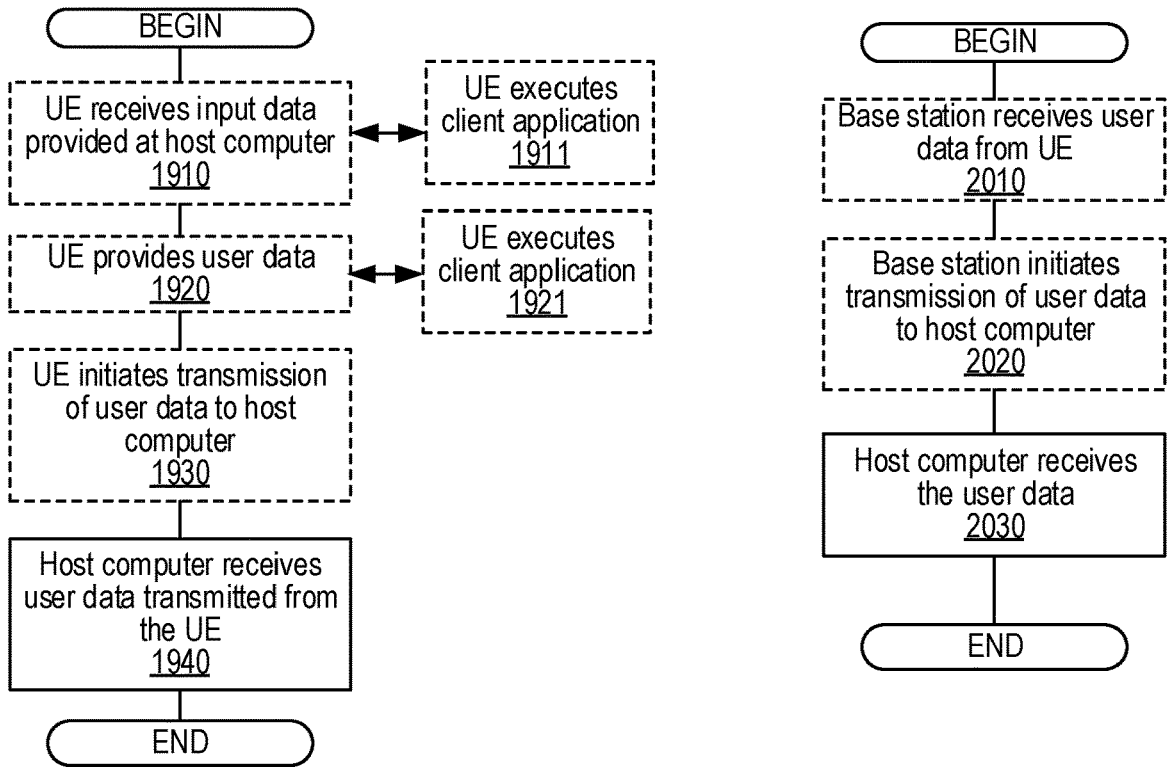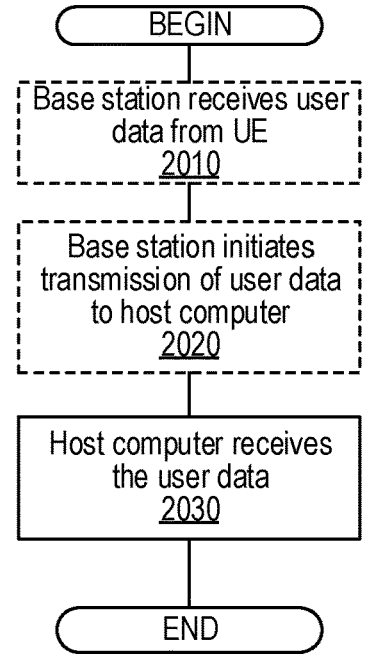
FIG. 19
FIG. 20

AUTOMATIC DISCOVERY OF ENODEB (ENB) PROXY FOR EN-DC CONFIGURATION TRANSFER

TECHNICAL FIELD

The present application relates generally to the field of wireless communication networks, and more specifically to devices, methods, and computer-readable media that facilitate simultaneous connectivity of a device or user equipment (UE) to multiple nodes in a radio access network (RAN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

In LTE, the Radio Resource Control (RRC) protocol is used to configure, setup, and maintain the radio connection between the user equipment (UE) and the base station, known as the evolved Node B (eNB). When the UE receives an RRC message from the eNB, it will apply the configuration (also referred to herein as "compile the configuration"), and if this succeeds the UE generates an RRC complete message that indicates the transaction ID of the message that triggered this response.

Since LTE Release 8, three Signaling Radio Bearers (SRBs), namely SRB0, SRB1 and SRB2 have been available for the transport of RRC and Non Access Stratum (NAS) messages between the UE and eNB. A new SRB, known as SRB1bis, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel. SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

A dual connectivity framework has been defined in LTE Release 12. Dual connectivity (or DC) refers to a mode of operation in which a UE, in RR_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). In the alternative, they can be referred to more generally as a master node (MN) and a secondary node (SN), respectively. DC can be viewed as a special case of carrier aggregation (CA), where multiple carriers, or cells, are provided by network nodes that are physically separated from one another and that are not connected through a fast, quality connection.

More specifically, in DC, the UE is configured with a Master Cell Group (MCG) and a Secondary Cell Group (SCG). A Cell Group (CG) is a group of serving cells associated with either the MeNB or the SeNB(s). MCG and SCG are defined as follows:

Master Cell Group (MCG) is a group of serving cells associated with the MeNB, comprising a primary cell (PCell) and optionally one or more secondary cells (SCells).

Secondary Cell Group (SCG) is a group of serving cells associated with the SeNB comprising a Primary SCell (pSCell) and optionally one or more SCells.

Put another way, a UE in DC maintains simultaneous connections to anchor and booster nodes, where the anchor node is also referred to as the MeNB and the booster nodes are also referred to as SeNBs. As its name implies, the MeNB terminates the control plane connection towards the UE and, as such, is the controlling node of the UE, including handovers to and from SeNBs. For example, the MeNB is the eNB that terminates at least the S1-MME connection, i.e., the connection between the eNB and the Mobility Management Entity (MME) for the UE. An SeNB is an eNB that is providing additional radio resources (e.g., bearers) for the UE but that is not the MeNB. Types of radio resource bearers include MCG bearers, SCG bearers, and split bearers.

RRC connection with the UE is handled only by the MeNB and, accordingly, SRBs (Signaling Radio Bearers) are always configured as MCG bearer type and therefore only use the radio resources of the MeNB. However, the MeNB can also configure the UE based on input from the SeNB and hence the SeNB can also indirectly control the UE. In an LTE-DC configuration, the MeNB is connected to the SeNBs via the Xn interface, which is currently selected to be the same as the X2 interface between the two eNBs.

According to LTE principles, UEs provide measurement reports—whether due to event trigger or a periodic trigger—comprising measurements of serving cell(s). For UE in LTE-DC, "serving cells" include cells in MCG and in SCG. For mobility measurement, an MeNB configures a UE according to various criteria including, e.g., frequency to measure, how to report, etc. Correspondingly, the UE sends measurement results to the MeNB once the measurement criteria are met. When the UE sends a measurement report to the network, whether event-triggered or periodic-triggered, the UE should always include measurement results of its serving cell(s). For a UE in LTE-DC, "serving cells" includes cells in MCG (provided by MeNB) and cell(s) in SCG (provided by SeNB).

FIG. 1A illustrates various exemplary LTE DC scenarios involving UEs 110 and base stations (eNBs) 120. As shown, only one SeNB (at most) is connected to any of the illustrated UEs. However, more than one SeNB can serve a UE in general. Moreover, only one cell each from both MeNB and SeNB are shown to be serving the UE, however more than one cells can serve the UE in practice from both MeNB and SeNB. From the figure, it should also be clear that dual connectivity is a UE-specific feature and that a given network node (or a serving cell) can support a dual-connected UE and a legacy UE at the same time. In other words, MeNB and SeNB are roles played, or functions provided, by eNBs 120 in a particular situation, e.g., with respect to a particular UE. Thus, while the eNBs 120 in FIG. 1a are labeled "MeNB" and "SeNB," this indicates only that they are playing this role for at least one UE 110. Indeed, a particular eNB 120 may be an MeNB for one UE 110 while being an SeNB for another UE.

In other words, the master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE. Furthermore, in LTE, only inter-frequency DC is supported (i.e., the MCG and SCG must use different carrier frequencies).

In summary, DC allows an LTE-capable UE to be connected to two nodes—MeNB and SeNB—and to receive data from both nodes, thereby increasing its data rate. The MeNB (or MN) provides system information, terminates the control plane (CP), and can terminate the user plane (UP). An SeNB (or SN), on the other hand, terminates only the UP. The aggregated UP protocol stack for LTE DC is illustrated in FIG. 1B and includes MCG bearers (terminated by MeNB), SCG bearers (terminated by SeNB), and split bearers (terminated by MeNB and SeNB). This UP aggregation achieves benefits such as increasing the per user throughput for users that have good channel conditions and the capability of receiving and transmitting at higher data rates than can be supported by a single node, even without a low-latency backhaul/network connection between the MeNB and SeNB.

In 3GPP, a study item on a new radio interface for 5G has recently been completed and 3GPP has now continued with the effort to standardize this new radio interface, often abbreviated by NR (New Radio). For the first phase of 5G standardization and deployment, a MN can use LTE connected to the EPC, and the SN will use NR. In this first phase (also known as "non-standalone NR"), the NR SN is not connected directly to the 5GC and all control plane (CP) traffic to/from the UE is via the LTE MN connected to the EPC.

After the completion of this phase, 3GPP will likely continue with standardization that encompass other scenarios, such as when a NR node (a base-station supporting NR radio, also called gNB) is connected to 5GC and acts as MN. 3GPP TR 38.804 (v14.0.0) describes various exemplary DC scenarios or configurations where the MN and SN are applying either NR, LTE or both. The following terminology is used to describe these exemplary DC scenarios or configurations:

DC: LTE DC (i.e., both MN and SN employ LTE, as discussed above);

EN-DC: LTE-NR dual connectivity where LTE is the master and NR is the secondary. The NR secondary node (SN or gNB) relies on the LTE master node (MN or MeNB) for a control plane connection to the EPC core network (EPC). This is also referred to as "Non-standalone NW". In this case, the functionality of an NR SN cell is limited and would be used for connected mode UEs as a booster and/or diversity leg, but a UE cannot camp on nor be handed over to these NR cells.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR.

MR-DC (multi-RAT DC): a generalization of the Intra-E-UTRA Dual Connectivity (DC) described in 3GPP TS 36.300 (v15.2.0), where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC and NE-DC are two different example cases of MR-DC.

Since deployment and/or migration for these options may differ for different operators, it could be possible to have deployments with multiple options in parallel in the same network. In combination with LTE/NR DC solutions, it is also possible to support CA (Carrier Aggregation) in each cell group (i.e., MCG and SCG) and DC between nodes on same RAT (e.g., NR-NR DC). For the NR cells, a consequence of these different deployments is the co-existence of NR cells supporting SA only, NSA only, or both SA and NSA.

FIG. 2 shows an architecture diagram of an exemplary network supporting EN-DC. In this exemplary architecture, E-UTRAN 298 is connected to EPC 299. More specifically, E-UTRAN 299 includes eNBs 210a,b that connect to one or more Mobility Management Entities (e.g., MMEs 230a,b) and one or more Serving Gateways (e.g., SGWs 240a,b) in EPC 298 via respective S1 interfaces. In addition, E-UTRAN 298 includes en-gNBs 220a,b that connect to SGWs 240a,b via respective S1-U interfaces. Within E-UTRAN 299, eNBs 210a,b connect to each other and to en-gNBs 220a,b via respective X2 interfaces, while and en-gNBs 220a,b connect to each other via an X2-U interface. When EN-DC is employed in this architecture, one of eNBs 210a,b can act as MN for a particular UE and one of en-gNBs 220a,b can act as SN for that UE. In general, an en-gNB is different from a gNB (such as found in an NG-RAN) in that it only implements part of the 5G functionality that is required to perform SN functions for EN-DC.

Although the EN-DC architecture shown in FIG. 2 is known at a high level, there are various lower-level details that must be resolved in order to facilitate EN-DC deployment and operation. For example, there exists various unresolved issues regarding the determination of transport network layer (TNL) addresses for communication between eNBs and en-gNBs over the X2 interface.

SUMMARY

Exemplary embodiments disclosed herein address these and other problems, issues, and/or drawbacks of existing solutions by providing flexible and efficient techniques to configure transport network layer (TNL) addresses for communication between eNBs and en-gNBs over the X2 interface. Such exemplary embodiments can improve network functionality and/or reliability by reducing the amount of network configuration required.

Exemplary embodiments include methods and/or procedures for configuring a first node of a first radio access technology (RAT) in a radio access network (RAN), for dual connectivity (DC) toward a user equipment (UE) with nodes of a second RAT in the RAN. These exemplary methods and/or procedures can be performed by a network node (e.g., base station, gNB, en-gNB) of the first RAT in the RAN.

The exemplary methods and/or procedures can include receiving, from a domain name service (DNS) server, an address of a first node of the second RAT, wherein the first node of the second RAT is configured to act as an address request proxy for a plurality of nodes of the first RAT. In some embodiments, the address of the first node of the second RAT can be a transport network layer (TNL) address, for an X2 interface, that includes a fully qualified domain name (FQDN). The exemplary methods and/or procedures can also include, based on the first address, establishing a first connection with the first node of the second RAT. The exemplary methods and/or procedures can also receive a third request to setup a second connection with a second node of the second RAT. The exemplary methods and/or procedures can also include sending, to the second node of the second RAT, a fourth request for the second node to act as an address request proxy for the first node of the first RAT. In some embodiments, the fourth request can be included in a third response to the third request.

In some embodiments, the first RAT can be New Radio (NR) second RAT can be Long Term Evolution E-UTRA (LTE E-UTRA). In some embodiments, the first node of the first RAT can be an en-gNB and the first and second nodes of the second RAT can be eNBs.

Other embodiments include methods and/or procedures for a second node of a second radio access technology (RAT) in a radio access network (RAN), to configure dual connectivity (DC) towards a user equipment (UE) with a first node of a first RAT in the RAN. These exemplary methods and/or procedures can be performed, for example, by a network node (e.g., base station, eNB) of a second RAT in the RAN.

The exemplary methods and/or procedures can include sending, to a core network (CN) node, a first request for an address of the first node of the first RAT. The exemplary methods and/or procedures can also include receiving, from the CN node, a first response including the address of the first node of the first RAT. In some embodiments, the first request can include an identifier of the first node of the first RAT and an identifier of the second node. In some embodiments, the address of the first node of the first RAT is a transport network layer (TNL) address for an X2 interface. In such embodiments, the exemplary methods and/or procedures can also include receiving, from a UE, an identifier of a cell served by the first node of the first RAT, and determining the identifier of the first node of the first RAT based on the identifier of the cell served by the first node of the first RAT.

The exemplary methods and/or procedures can also include, based on the received address, sending a third request to setup a connection with the first node of the first RAN. The exemplary methods and/or procedures can also include receiving, from the first node of the first RAT, a fourth request for the second node to act as an address request proxy for the first node of the first RAT. In some embodiments, the fourth request can be included in a third response to the third request.

In some embodiments, the first RAT can be New Radio (NR) second RAT can be Long Term Evolution E-UTRA (LTE E-UTRA). In some embodiments, the first node of the first RAT can be an en-gNB and the first and second nodes of the second RAT can be eNBs.

Other embodiments include methods and/or procedures for a core network (CN) node to facilitate dual connectivity (DC) of radio access network (RAN) nodes of different radio access technologies (RATs) towards user equipment (UE). These exemplary methods and/or procedures can be implemented, for example, by a network node (e.g., MME) of a core network (CN, e.g., EPC) connected to a RAN having different RATs.

The exemplary methods and/or procedures can include receiving, from a second node of a second RAT, a first request for an address of a first node of a first RAT. The exemplary methods and/or procedures can also include determining that a first node of the second RAT is an address request proxy for the first node of the first RAT. The exemplary methods and/or procedures can also include obtaining the address of the first node in the first RAT from the first node of the second RAT. The exemplary methods and/or procedures can also include sending, to the second node of the second RAT, a first response including the address of the first node of the first RAT. In some embodiments, the address of the first node of the first RAT is a transport network layer (TNL) address for an X2 interface. The exemplary methods and/or procedures can also include subsequently receiving a second indication that the second node of the second RAT is the address request proxy for the first node of the first RAT.

In some embodiments, the first RAT can be New Radio (NR) second RAT can be Long Term Evolution E-UTRA (LTE E-UTRA). In some embodiments, the first node of the first RAT can be an en-gNB and the first and second nodes of the second RAT can be eNBs.

Other exemplary embodiments include network nodes (e.g., base stations, eNBs, en-gNBs, MMEs, etc. or components thereof) configured to perform operations corresponding to any of the exemplary methods and/or procedures described herein. Other exemplary embodiments include non-transitory, computer-readable media storing program instructions that, when executed by processing circuitry, configure such network nodes to perform operations corresponding to any of the exemplary methods and/or procedures described herein.

These and other objects, features and advantages of exemplary embodiments of the present disclosure will become apparent upon reading the following Detailed Description in view of the Drawings briefly described below.

BRIEF DESCRIPTION OF THE DRAWINGS

FIGS. 17-20 are flow diagrams illustrating exemplary methods and/or procedures implemented in a communication system, according to various exemplary embodiments of the present disclosure.

DETAILED DESCRIPTION

Figure 1A:
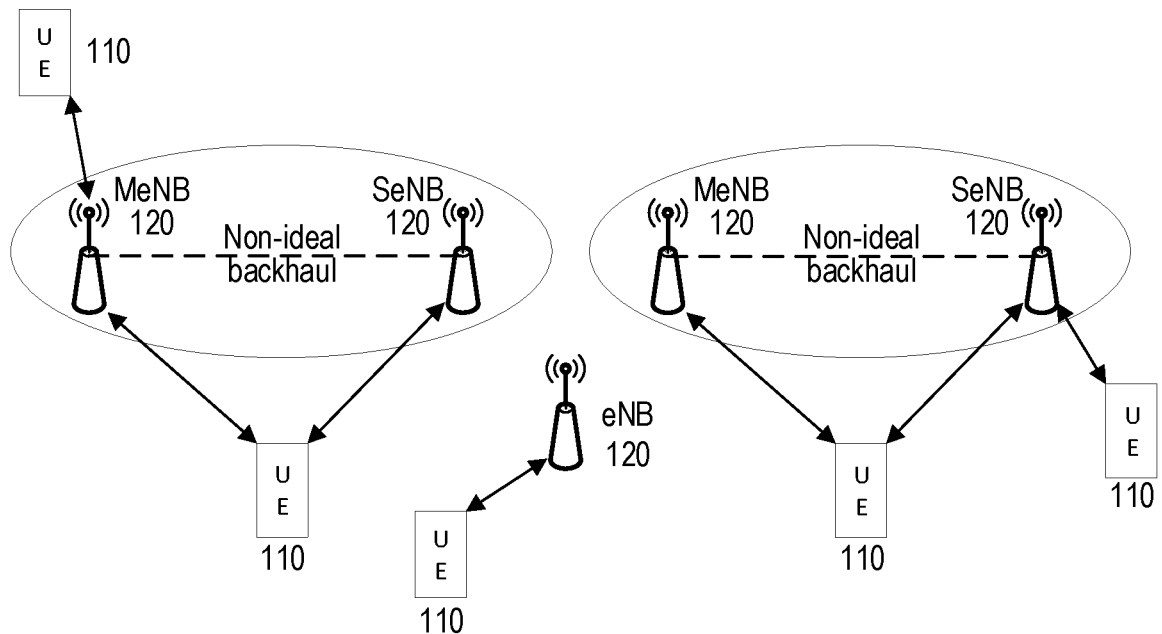
FIG. 1A is a high-level network diagram illustrating various exemplary Long-Term Evolution (LTE) dual connectivity (DC) scenarios involving user equipment (UEs) and evolved NodeBs (eNBs).
Figure 1B:
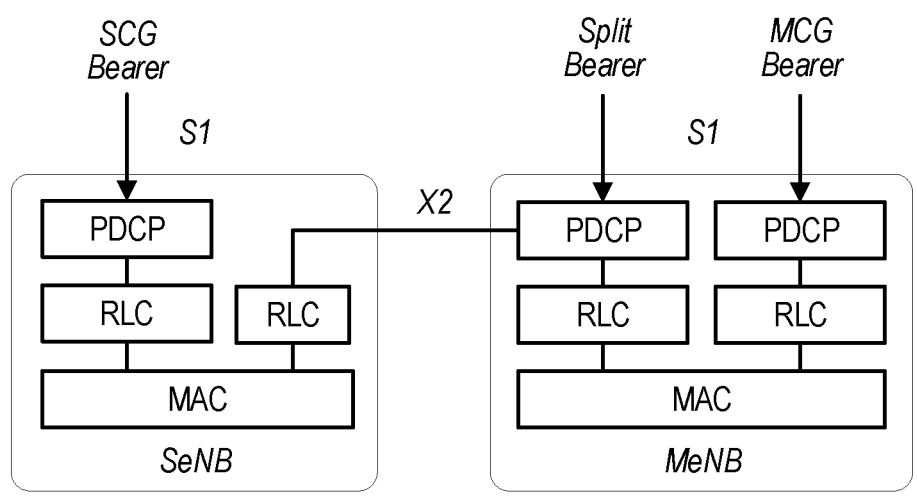
FIG. 1B illustrates an exemplary user plane (UP) protocol stack for LTE DC.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

In the following, the terms eNB (eNodeB), gNB (gNodeB), MCG (Master Cell Group) and Primary Cell (PCell) may be used interchangeably to refer to the node or cell which the UE is connected to in single connectivity. Likewise, the terms SN (secondary node), SeNB (Secondary eNodeB), SgNB (Secondary gNodeB), SCG (Secondary Cell Group), and PSCell (Primary Secondary Cell) may be used interchangeably to refer to the secondary node or cell that the UE is connected to when the UE is configured with dual connectivity (DC).

LTE-NR tight interworking (a form of EN-DC, with the terms being used interchangeably herein) is currently being discussed for Release 15. In this context, the major changes from LTE DC are the introduction of:

Split UP bearer from the SN, also referred to as SCG split bearer. In this case, the SN is also referred to as a SgNB (secondary gNB), where gNB is an acronym for NR base station.

Split RRC bearer (i.e., one RRC connection via MN and SN lower layers), also referred to as split SRB; and Direct RRC connection between SN and UE, also referred to as SCG SRB, direct SRB, or SRB3.

Figure 3A:
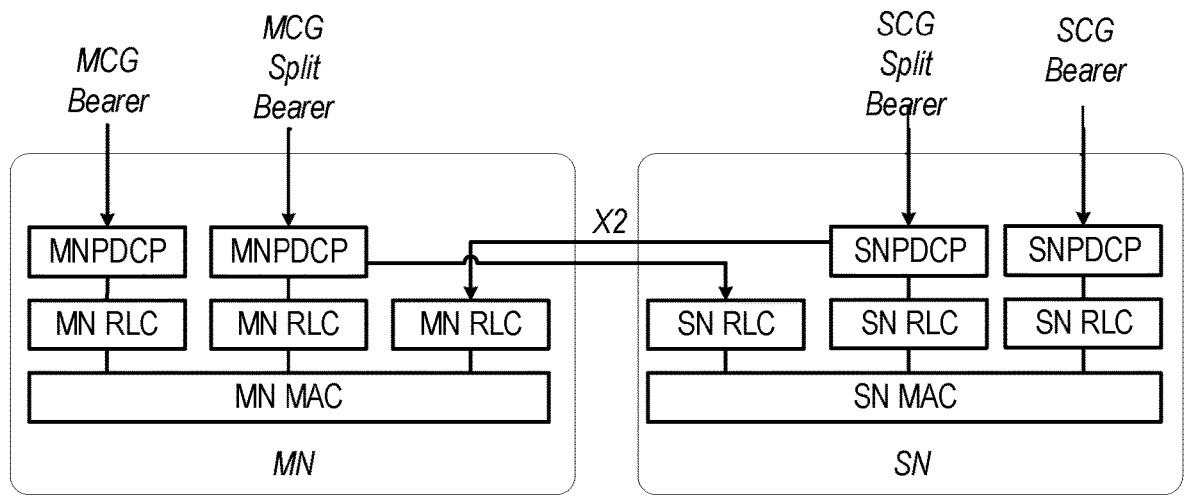
FIGS. 3A and 3B show exemplary User Plane (UP) and Control Plane (CP) architectures, respectively, for LTE-NR tight interworking, both from a network perspective.
Figure 3B:
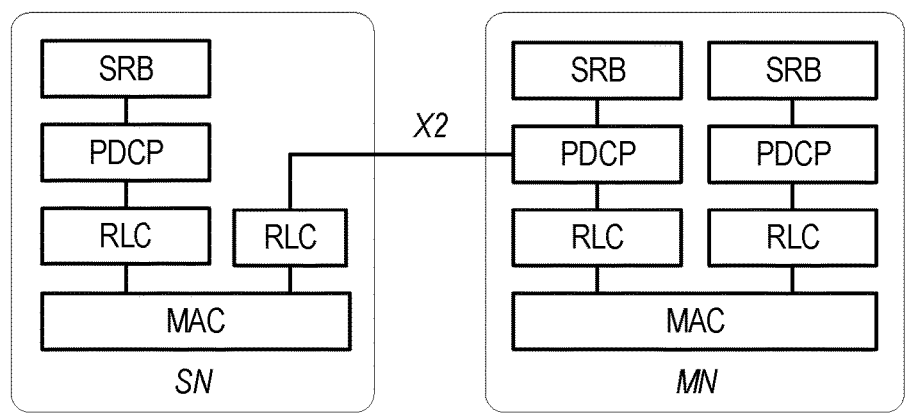
Figure 4:
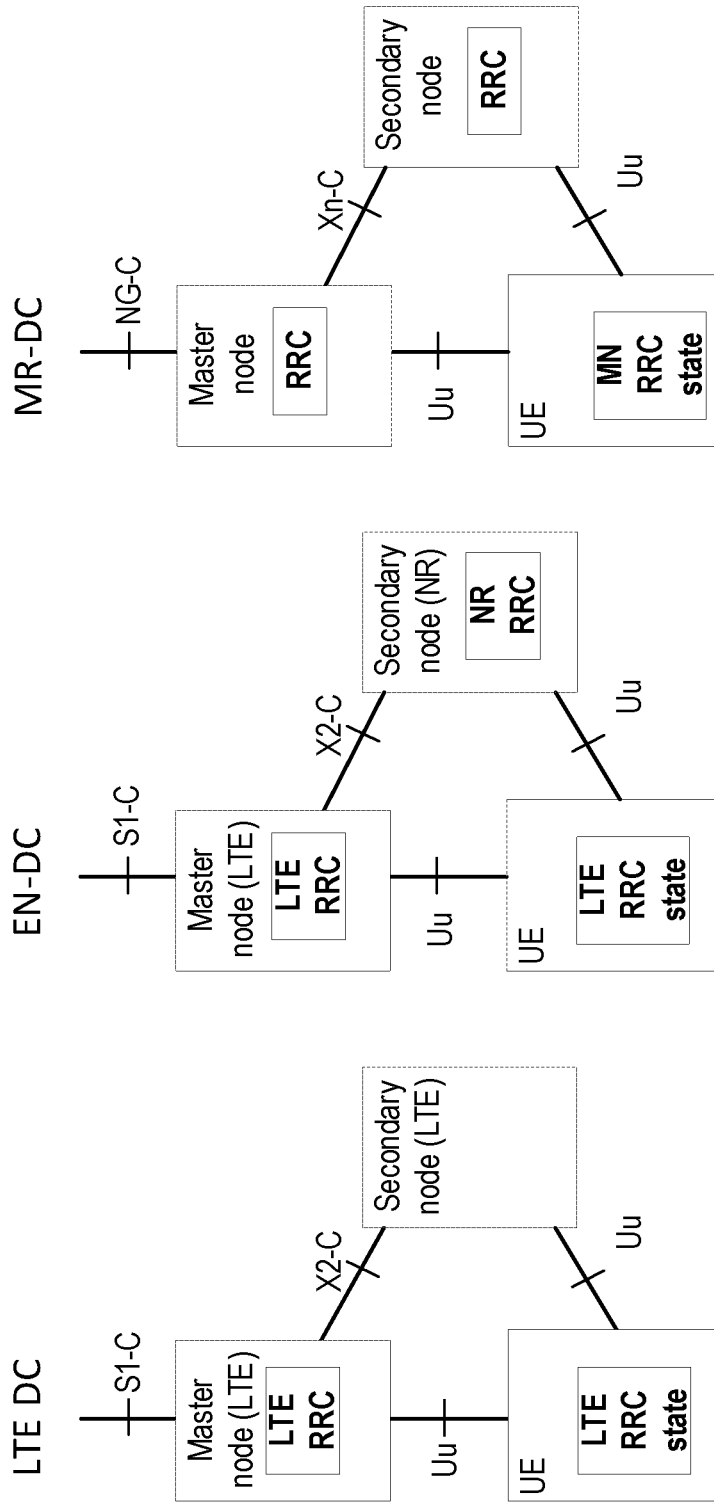
FIG. 4 is a block diagram showing exemplary CP architectures in LTE DC, EN-DC, and MR-DC using a 5G core network (5GC).
Figure 5A:
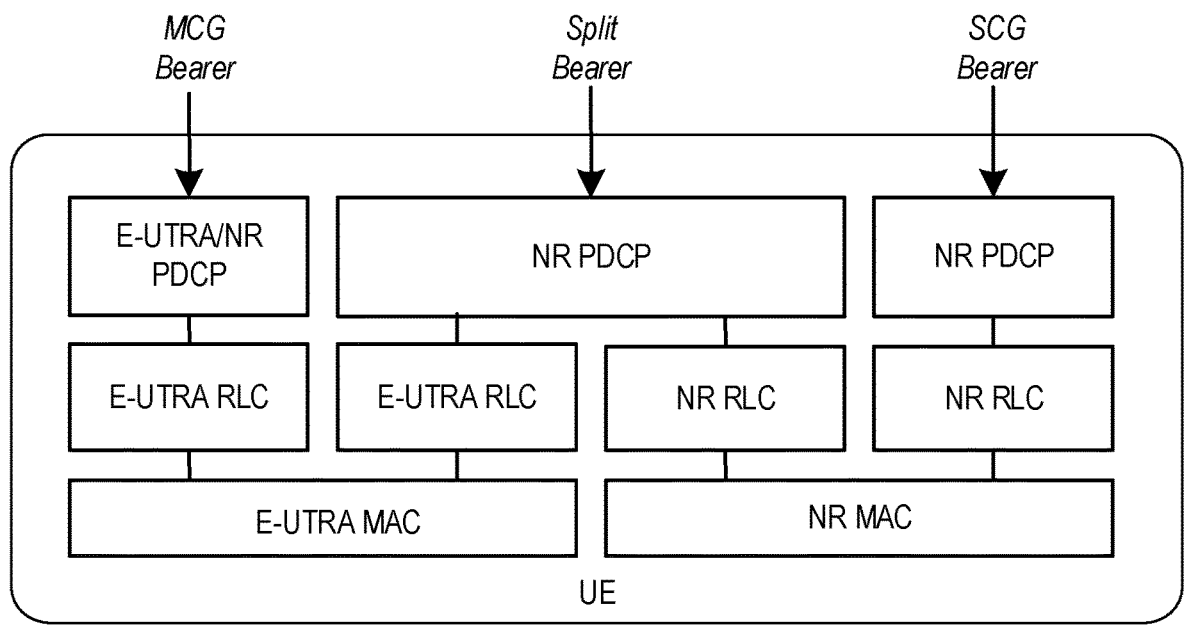
FIG. 5A shows an exemplary radio protocol architecture for MCG, SCG, and split bearers from a UE perspective in LTE-NR tight interworking.
Figure 5B:
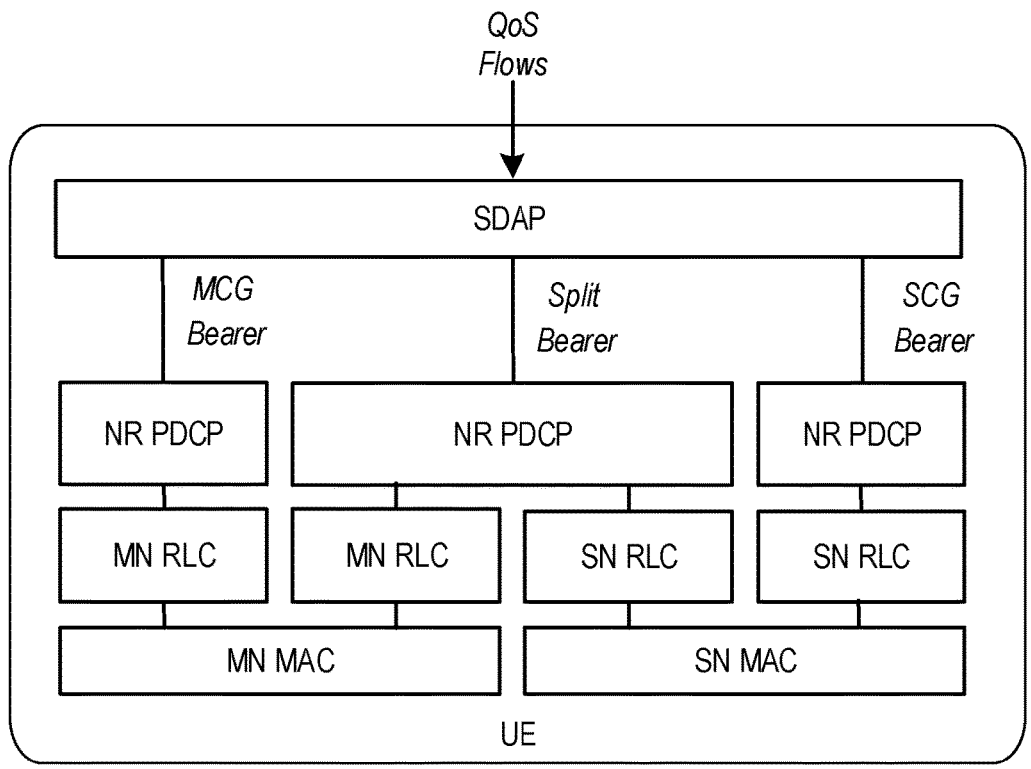
FIG. 5B shows an exemplary Radio Protocol Architecture for MCG, SCG, and split bearers from a UE perspective in MR-DC with 5GC (NGEN-DC, NE-DC).
Figure 6A:
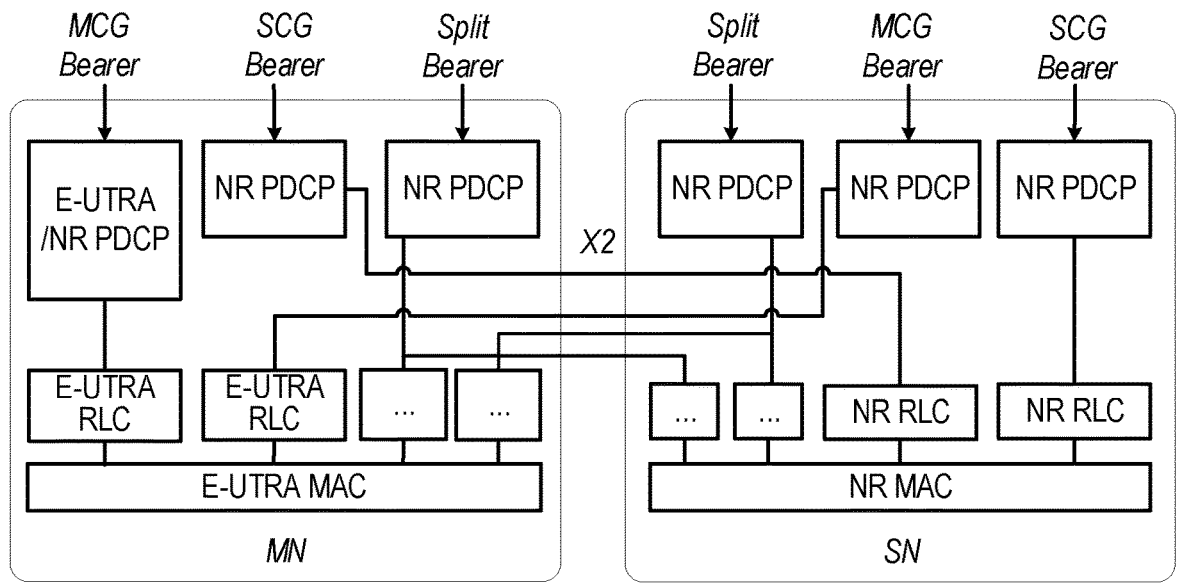
FIG. 6A illustrates network side protocol termination options for MCG, SCG, and split bearers in MR-DC with EPC (e.g., EN-DC).
Figure 6B:
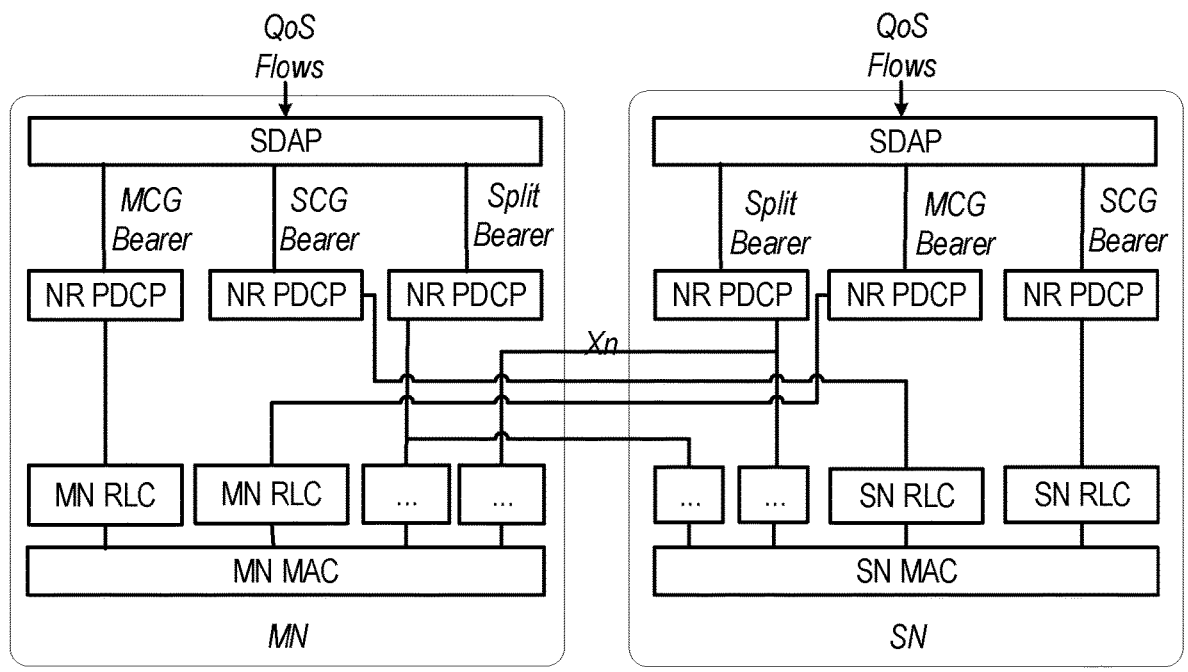
FIG. 6B illustrates network side protocol termination options for MCG, SCG, and split bearers in MR-DC with 5GC (e.g., NGEN-DC, NE-DC).

FIGS. 3A and 3B show exemplary User Plane (UP) and Control Plane (CP) architectures, respectively, for LTE-NR tight interworking, both from a network perspective. FIG. 4 is a block diagram showing a high-level comparison of CP architectures in LTE DC, EN-DC, and MR-DC using a 5G core network (5GC). FIG. 5A shows an exemplary radio protocol architecture for MCG, SCG, and split bearers from a UE perspective in LTE-NR tight interworking, while FIG. 5B shows an exemplary radio protocol architecture for MCG, SCG, and split bearers from a UE perspective in MR-DC with 5GC (NGEN-DC, NE-DC). FIG. 6A illustrates network side protocol termination options for MCG, SCG, and split bearers in MR-DC with EPC (e.g., EN-DC), while FIG. 6B illustrates network side protocol termination options for MCG, SCG, and split bearers in MR-DC with 5GC (e.g., NGEN-DC, NE-DC). The following description refers to these figures.

As shown in FIG. 3A, a MN can forward UP bearer traffic (e.g., on a PDCP layer) to a SN over the X2 interface, while a SN can likewise forward PDCP traffic to a MN over the X2 interface. In the first stages of EN-DC standardization/implementation, however, a likely scenario is that the NR SN is not connected directly to the 5G core network (5GC), but all UP traffic between the UE and SN is carried via the X2 interface to/from the LTE MN and, eventually, to the LTE Evolved Packet Core (EPC) network. Subsequently, DC scenarios involving NR SNs (or NR MNs) carrying UP traffic directly to/from the 5GC may be standardized for implementation.

Figure 2:
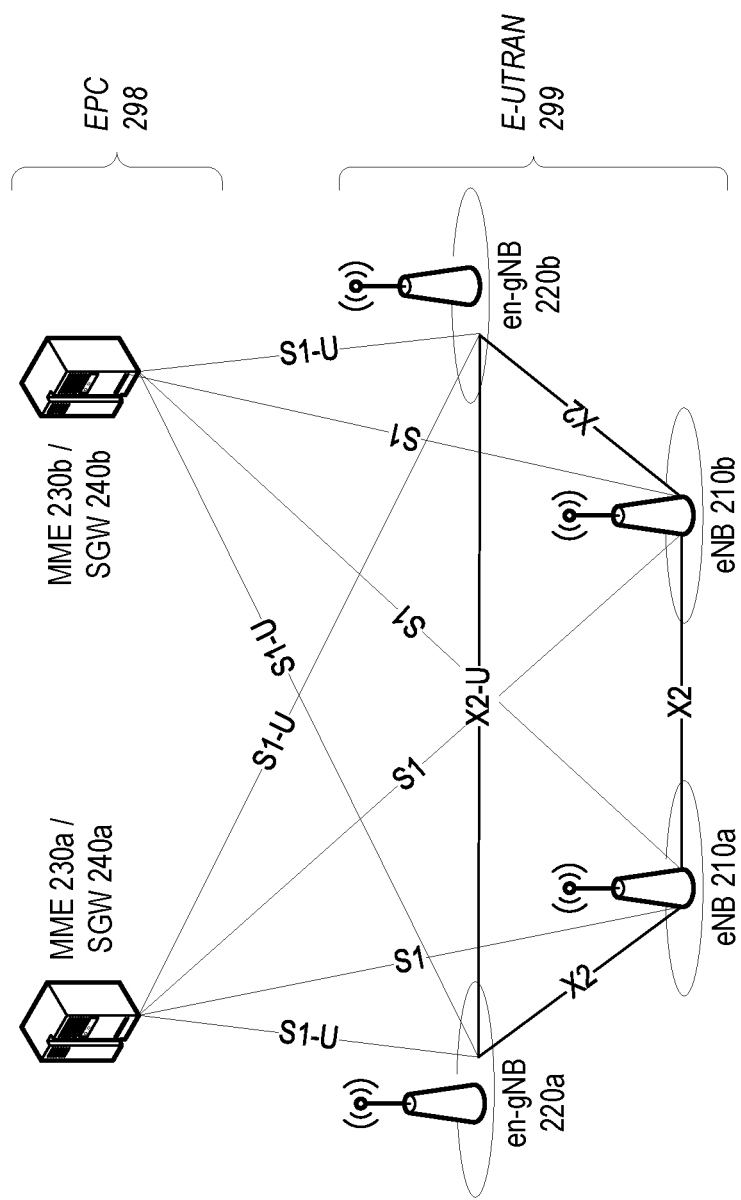
FIG. 2 shows an architecture diagram of an exemplary network supporting EN-DC.

Similarly, FIG. 3B illustrates that a UE can receive CP traffic via separate SRBs from the MN and SN. This means that a UE can receive signaling messages, i.e., RRC (Radio Resource Control) messages, both from the MN and the SN. Consequently, in the EN-DC CP scenario shown in FIG. 2B, there are two RRC instances responsible for controlling the UE—one directed from the MN and another from the SN. A consequence is that the UE needs to terminate RRC signaling from both from the MN and the SN.

One motivation for introducing such multiple RRC instances in NR DC, and particularly in EN-DC, is to enable the MN and SN to semi-autonomously control radio resources. For example, MN can allocate resources from some spectrum using LTE, while SN can be responsible for configuring and allocating resources from some other spectrum that uses NR. Challenges for allocating resources in LTE and NR may differ substantially. For example, NR might be deployed in a frequency band where beamforming is highly desirable, while LTE might be allocated in a different frequency band with good coverage but with very congested resources. As such, it is important that the SN has some level of autonomy to configure and manage the UE on its associated resources. On the other hand, the overall responsibility for connectivity to the UE may remain with MN node, such the MN node has overall responsibility for mobility, state changes of the UE, meeting quality of service demands, etc.

Another motivation of introducing split RRC bearers is to provide "RRC diversity" that can enable better mobility robustness and improved signaling/control message delivery between the network and the UE. For example, an RRC message (e.g., handover message or any other reconfiguration message) can be sent over the better of the two links, MeNB-UE and SgNB-UE, even if one link has deteriorated significantly. It is also possible to send duplicate messages over both MeNB-UE and SgNB-UE to achieve a better success-rate and faster delivery if the links are error prone. Such benefits of "RRC diversity" are not available in the current LTE DC solution, and 3 GPP has therefore undertaken the challenge to enable such RRC diversity. Having RRC diversity may prove particularly important for use cases requiring ultra-reliable connections with low latency, often called URLLC (Ultra Reliable Low Latency Communication).

As illustrated in FIG. 3B, in the split-RRC-bearer (e.g., split SRB) architecture, RRC messages generated and/or transmitted from the MN can be sent either via the MeNB-UE (LTE) link or relayed over an X2 interface to be sent on the SgNB-UE (NR) link. The MN LTE PDCP layer is responsible for steering each RRC message to the appropriate link. The messages received over the different paths in the UE are then combined at the LTE PDCP layer and then forwarded to the RRC layer for further processing. A similar approach can be used in the UE uplink.

In EN-DC, SRB1 uses E-UTRA PDCP at initial connection establishment. Afterwards, MCG SRBs (SRB1-2) can be configured by the network to use either E-UTRA PDCP or NR PDCP. A PDCP version change (release of old PDCP and establish of new PDCP) of SRBs can be supported in either direction (i.e., from E-UTRA PDCP to NR PDCP or vice-versa) via a handover procedure (reconfiguration with mobility) or, for the initial change from E-UTRA PDCP to NR PDCP, with a reconfiguration without mobility, when the network knows there is no UL data buffered and before the initial security activation. For EN-DC capable UEs, NR PDCP can be configured for DRBs and SRBs also before EN-DC is configured.

If the SN is a gNB (i.e., for EN-DC and NGEN-DC), the UE can be configured to establish a SRB with the SN (SRB3) to enable RRC PDUs for the SN to be sent directly between the UE and the SN. RRC PDUs for the SN can only be transported directly to the UE for SN RRC reconfiguration without requiring any coordination with the MN. Measurement reporting for mobility within the SN can be done directly from the UE to the SN if SRB3 is configured. Split SRB is supported for all MR-DC options, allowing duplication of RRC PDUs generated by the MN, via the direct path and via the SN. Split SRB uses NR PDCP. This version of the specification does not support the duplication of RRC PDUs generated by the SN via the MN and SN paths.

In EN-DC, the SCG configuration is kept in the UE during suspension. The UE releases the SCG configuration (but not the radio bearer configuration) during resumption initiation.

With reference to FIG. 4, for MR-DC, each radio node has its own RRC entity (E-UTRA version if the node is an eNB or NR version if the node is a gNB) which can generate RRC PDUs to be sent to the UE. RRC PDUs generated by the SN can be transported via the MN to the UE. The MN always sends the initial SN RRC configuration via MCG SRB (SRB1), but subsequent reconfigurations may be transported via MN or SN. When transporting RRC PDU from the SN, the MN does not modify the UE configuration provided by the SN. Even so, the UE has only a single RRC state in MR-DC (based on MN RRC) and a single C-plane connection towards the core network (e.g., 5GC).

In MR-DC, only three bearer types are available from the UE perspective: MCG bearer, SCG bearer and split bearer (i.e., SCG split bearer is not available). However, the UE and network-side protocol terminations differ for these bearer types depending on the type of MR-DC utilized. For MR-DC with EPC (e.g., EN-DC), the UE and network protocol terminations for these three bearer types are depicted in FIGS. 5A and 6A, respectively. For EN-DC, the network can configure either E-UTRA PDCP or NR PDCP for MN terminated MCG bearers while NR PDCP is always used for all other bearers. For MR-DC with 5GC (e.g., NGEN-DC, NE-DC), the UE and network protocol terminations for these three bearer types are depicted in FIGS. 5B and 6B, respectively. In this arrangement, NR PDCP is always used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN.

As mentioned above, although EN-DC architecture shown in FIG. 2 is known at a high level, there exists various unresolved issues regarding the determination of transport network layer (TNL) addresses for communication between eNBs and en-gNBs over the X2 interface. These issues are discussed in more detail below. In addition, 3GPP TS 37.340, incorporated herein by reference, provides additional description of procedures for MR-DC variants utilizing the 5GC (i.e., NE-DC, NGEN-DC or NR-NR DC), as well as for variants utilizing the EPC (i.e., EN-DC).

Figure 7:
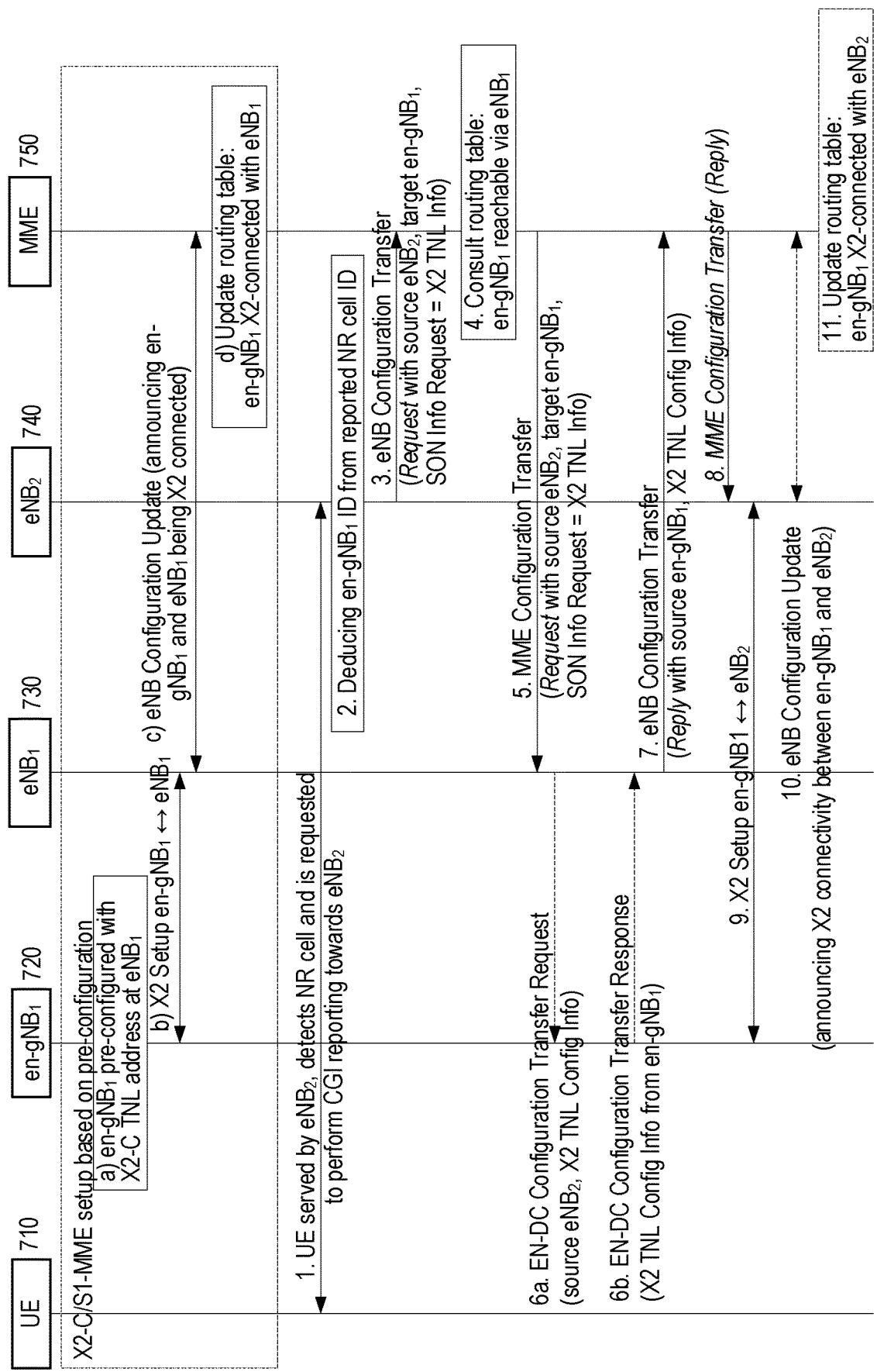
FIG. 7 illustrates an exemplary procedure for adding an en-gNB as a SN for EN-DC with a UE currently in communication with a MeNB.

FIG. 7 illustrates an exemplary procedure for adding an en-gNB as a SN for EN-DC with a UE currently in communication with a MeNB. The procedure shown in FIG. 7 in involves a pre-configuration portion (operations a-d) and a TNL address discovery portion (operations 1-11), both of which are described below. Even so, the alphabetical and numerical labeling is used only to facilitate clarity in the description. The respective orders of the operations in each portion are merely exemplary, and the operations can be rearranged, combined, and/or divided in certain embodiments. Dashed lines indicate operations whose performance may depend on one or more conditions.

In operation/condition a of the pre-configuration portion, each en-gNB (e.g., en-gNB$_1$) is assumed to be configured with at least one X2-C TNL address of an eNB (e.g., eNB$_1$) with which it is supposed to communicate during EN-DC. In some deployment scenarios, the eNB and the en-gNB can be co-located. In operation b), eNB$_1$ and en-gNB$_1$ establish connectivity over the X2-C interface via an EN-DC X2 Setup procedure, as defined in 3GPP TS 36.423 (v15.2.0). This can involve en-gNB$_1$ sending an X2 Setup Request message to eNB$_1$ (e.g., via the configured X2-C TNL address), which replies with an X2 Setup Response message.

In operation c), eNB$_1$ sends an eNB Configuration Update message to inform the MME(s) to which it is connected that it has established connectivity with en-gNB$_1$ over the X2-C interface. In operation d), the MME updates a routing entry associated with eNB$_1$ in its lookup table according to this information provided by eNB$_1$, e.g., indicating that eNB$_1$ will be a TNL Address request proxy for en-gNB$_1$. Subsequently, the MME can redirect TNL address requests for en-gNB$_1$ to proxy eNB$_1$.

For example, a "TNL address" can include a GPRS Tunneling Protocol (GTP) Tunnel Endpoint Identifier (TEID) and a transport layer Internet Protocol (IP) address, such as defined in 3GPP TS 36.423 (v15.2.0). This TNL address information generally identifies a "tunnel." Accordingly, in the following description, the terms "tunnel information," "tunnel identifier(s)," "TNL address," and "TNL address information" are used interchangeably.

In operation 1 of the address discovery portion, a UE served by eNB$_2$ detects an NR cell yet unknown to eNB$_2$ and performs cell global identity (CGI) reporting for that NR cell to eNB$_2$. In operation 2, using this reported information, eNB$_2$ determines the ID of en-gNB$_1$ serving that NR cell. In operation 3, eNB$_2$ starts TNL address discovery of en-gNB$_1$ by indicating "X2 TNL Configuration Info" in the SON Information Request IE of the eNB Configuration Transfer message sent to its MME. The eNB$_2$ also provides routing information in the message, e.g., the source eNB$_2$ ID and the target en-gNB$_1$ ID.

In operation 4, the MME consults its routing table (updated during pre-configuration) to determine that the request should be sent to eNB$_1$. In operation 5, the MME forwards the request to eNB$_1$ in an WE Configuration Transfer message. For example, this message can include the routing information, e.g., source eNB$_2$ ID and target en-gNB$_1$ ID.

In operation 7, eNB$_1$ can reply to the MME with an eNB Configuration Transfer message that includes the TNL address information of en-gNB$_1$. In case this information is not available at eNB$_1$, prior to this reply, eNB$_1$ can send a request to en-gNB$_1$ for the X2 TNL address information (operation 6a), and en-gNB$_1$ can respond with the requested information (operation 6b). In operation 8, after receiving the TNL address information of en-gNB$_1$, the MME sends to eNB$_2$ a reply MME Configuration Transfer message including the requested TNL address information of en-gNB$_1$.

In operation 9, eNB$_2$ and en-gNB$_1$ establish connectivity over the X2 interface, in a similar manner as between eNB$_2$ and en-gNB$_1$ in operation b), described above. Optionally, in operation 10, eNB$_2$ can send an eNB Configuration Update message to the MME including the TNL address information of en-gNB$_1$, indicating that eNB$_2$ has established connectivity with en-gNB$_1$. If such a message is sent, then in operation 11, the MME updates a routing entry associated with eNB$_2$ in its lookup table according to this information.

Although the above-described procedure enables an eNB to automatically obtain an TNL address of any en-gNB in the network, it assumes that each en-gNB to be configured with at least one X2-C TNL address of an eNB with which it is supposed to communicate (e.g., in operation a) of the pre-configuration). Rather than being fully "automatic," this procedure is dependent on a manual (initial) configuration of an X2-C TNL address for all en-gNBs after or during their installation in the network. Furthermore, the initially selected eNB (e.g., eNB$_1$) also must be a suitable EN-DC neighbor, which is dependent on radio conditions in the eNB's location relative to the en-gNB. Those assumptions and their implications make a fully automated integration of en-gNBs with eNBs into an EN-DC configuration impossible.

One possible solution for an automated X2-C TNL IP-address discovery is to introduce a DNS lookup of the en-gNB$_1$ ID as a new operation after operation 2 in FIG. 7. In such case, the eNB would use en-gNB$_1$ TNL IP-address obtained through DNS to establish X2 towards the en-gNB. However, this solution requires initial configuration and subsequent updates (as needed) of the DNS lookup, e.g., one entry for each deployed en-gNB. These tasks require a lot of effort as the number of en-gNBs added to the network increases during the 5G deployment.

Exemplary embodiments of the present disclosure address these and other problems and/or shortcomings of prior solutions by a novel technique whereby an en-gNB automatically discovers an arbitrary initial proxy eNB (via DNS lookup) with a constant fully qualified domain name (FQDN), and where the initial proxy eNB is automatically replaced with a further proxy eNB that is a suitable for EN-DC. In this technique, an eNB configured as being an initial proxy can create the DNS entry for itself automatically (e.g., by using a DynDNS method). In this manner, manual DNS entry configuration is avoided, and if any configuration changes are made to the IP-address of the proxy eNB(s) they are automatically updated in the DNS.

Exemplary embodiments can improve network functionality and/or reliability by reducing the amount of network configuration required. In particular, there is no need for manual configuration of an en-gNB node regarding X2-C TNL IP-address configuration of a neighbor eNB after deployment. Rather, the technique requires only a one-time DNS configuration, which can be <1% of the configuration required for direct en-gNB lookup. The technique also reduces the number of proxy eNBs that are registered by the MME for a particular en-gNB, and makes it possible to remove the initial X2 proxy connection thereby reducing the processing load on the DNS-registered proxy eNBs.

In some embodiments, when an en-gNB is started and/or initialized, it can perform a DNS lookup for an initial and/or temporary eNB neighbor that will act as an EN-DC Configuration Transfer proxy (also referred to as an "address request proxy"). For example, this can involve DNS lookup of a FQDN such as endcproxyenb.eutran.<mnc>.<mcc>. 3gppnetwork.org, where <mnc> and <mcc> are the mobile network code and mobile country code of the network in which the en-gNB is installed. The DNS server can be configured with a list of X2 TNL IP-addresses of selected eNB(s) that can act as initial proxy for a Configuration Transfer Procedure for any en-gNB in the network. The DNS server can reply to such DNS requests with a selected IP address from that list, with the selection being made according to a predefined order.

For example, round-robin selection can be used to distribute the en-gNB proxying requirements equally to the eNB initial proxies. In some embodiments, one eNB can be an initial proxy for up to 256 en-gNBs at any given time. As such, the number of eNB proxies needing to be configured can be as low as 1/256 of the number required for conventional direct proxying, as discussed above.

These embodiments can be used to fulfill the assumption/requirement in pre-configuration operation a) that "each en-gNB is assumed to be configured with at least one X2-C TNL address of an eNB with which it is supposed to communicate." Even so, the en-gNBs do not require manual configuration, nor are en-gNBs required to be connected to an eNB that is suitable (e.g., radio conditions, degree of geographical separation) to carry out EN-DC procedures toward a UE. Accordingly, the initially assigned proxy eNB can be subsequently changed to another eNB that is suitable for EN-DC.

For example, in the en-gNB$_1$/eNB$_2$ X2 connection setup during operation 9 of FIG. 7, en-gNB$_1$ can indicate in an X2 SETUP Response to eNB$_2$ that it would like to change proxy after the eNB$_2$-initiated X2 setup procedure. This decision can be based on, e.g., the assumption that eNB$_2$ will be suitable for EN-DC with en-gNB$_1$ because a UE served by eNB$_2$ identified en-gNB$_1$ in a measurement report. Requesting this proxy change once (e.g., by a one-bit field in the X2 SETUP Response message) avoids a proxy change every time a different eNB detects en-gNB$_1$.

When eNB$_2$ receives this request (e.g., in the X2 SETUP Response message) to act as new proxy for en-gNB$_1$, it can perform the pre-configuration operation c) shown in FIG. 7. In other words, eNB$_2$ can send an eNB Configuration Update message to inform the MME(s) to which it is connected that it has established connectivity with en-gNB$_1$ over the X2-C interface. Given this information, in operation d), the MME can update a routing entry associated with eNB$_2$ in its lookup table, e.g., indicating that eNB$_2$ will be a TNL Address request proxy for en-gNB$_1$. Subsequently, the MME can redirect TNL address requests for en-gNB$_1$ to proxy eNB$_2$. The old eNB proxy will not be used for routing of messages to en-gNB$_1$ and can be over-written. In addition, en-gNB$_1$ can shut down the initial X2 connection to eNB$_1$.

Figure 8:
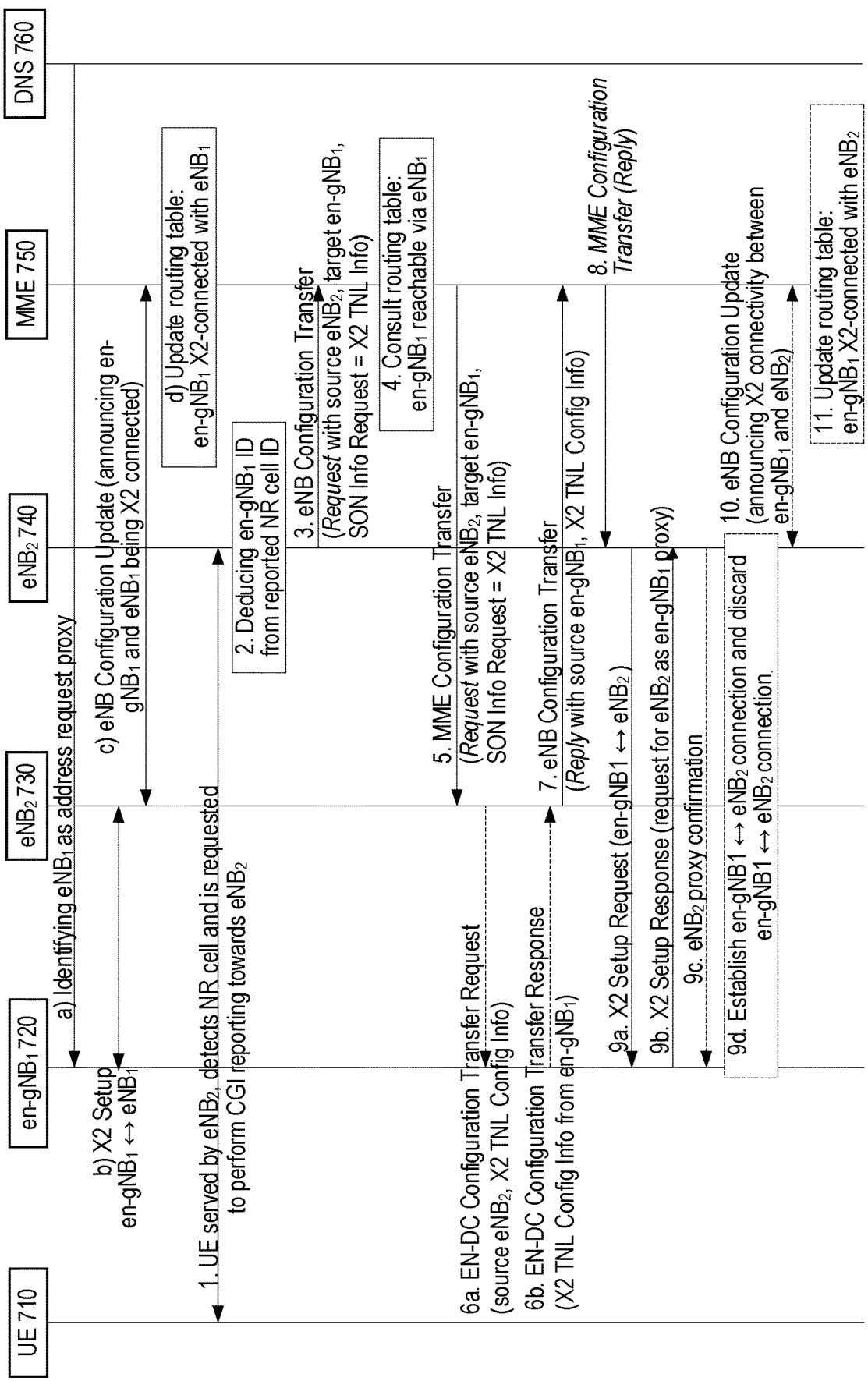
FIG. 8 illustrates an improved procedure for adding an en-gNB as a SN for EN-DC with a UE currently in communication with a MeNB, according to various exemplary embodiments of the present disclosure.

FIG. 8 illustrates an exemplary procedure for adding an en-gNB as a SN for EN-DC with a UE currently in communication with a MeNB, in accordance with the embodiments described above. The procedure shown in FIG. 8 is similar to the procedure shown in FIG. 7, but with the addition of the DNS configuration of an initial address request proxy and subsequent change to a different address request proxy for en-gNB$_1$. More specifically, in operation a), rather than assuming an initial configuration of an eNB address, en-gNB$_1$ obtains an address of eNB$_1$, as the initial proxy, via DNS lookup to the DNS server (760) in the manner described above. Furthermore, in operation 9 (now shown as 9a-9d), en-gNB$_1$ includes in an X2 Setup Response message (9b, to eNB$_2$) a request for eNB$_2$ to become the address request proxy for en-gNB$_1$. Optionally, in operation 9c, eNB$_2$ can respond with a confirmation that it will act as the address request proxy for en-gNB$_1$. Optionally, in operation 9d, en-gNB$_1$ can establish a connection with eNB$_2$ and discard the previously established connection with eNB$_1$.

These embodiments described above can be further illustrated with reference to FIGS. 9-11, which depict exemplary methods and/or procedures performed by network nodes in a RAN or a CN. In other words, various features of the operations described below, with reference to FIGS. 9-11, correspond to various embodiments described above. Furthermore, for avoidance of confusion, each of the terms "first request," "first response," "second request," "second response," "third request," "third response," "fourth request," and "fourth response" is used consistently to refer to a particular message exchanged between network nodes, rather than to enumerate messages sent/received by any single network node.

Figure 9:
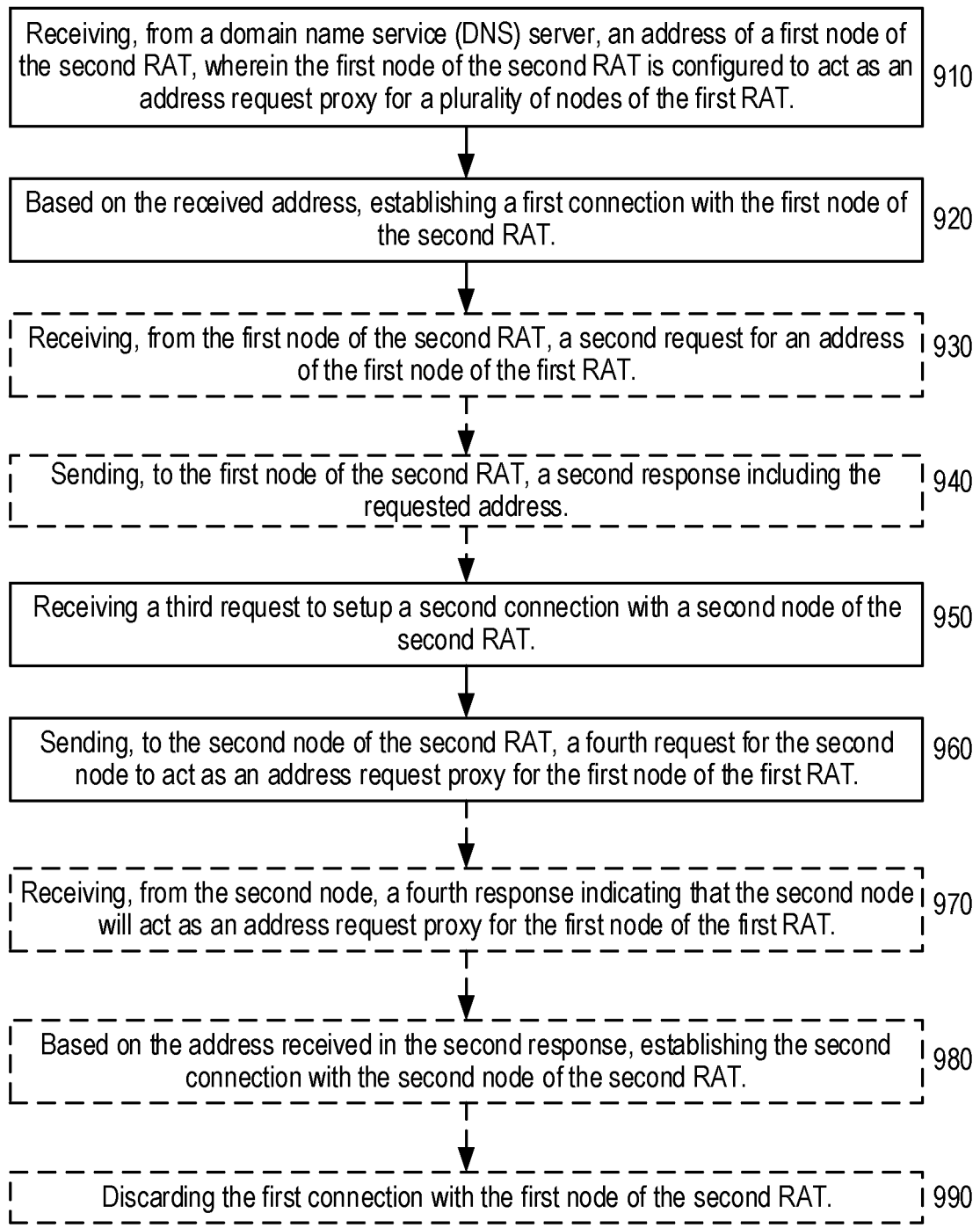
FIGS. 9-10 are flow diagrams illustrating exemplary methods and/or procedures performed by network nodes (e.g., base station, eNB, en-gNB, etc. or components thereof) in a radio access network (RAN, e.g., E-UTRAN), according to various exemplary embodiments of the present disclosure.

More specifically, FIG. 9 is a flow diagram illustrating an exemplary method and/or procedure for configuring a first node of a first radio access technology (RAT) in a radio access network (RAN), for dual-connectivity (DC) toward a user equipment (UE) with nodes of a second RAT in the RAN, according to various exemplary embodiments of the present disclosure. The exemplary method and/or procedure shown in FIG. 9 can be implemented by a network node (e.g., base station, gNB, en-gNB) of the first RAT in the RAN, such as described in relation to other figures herein. Furthermore, the exemplary method and/or procedure shown in FIG. 9 can be utilized cooperatively with other exemplary methods and/or procedures described herein (e.g., FIGS. 10-11) to provide various exemplary benefits described herein. Although FIG. 9 shows specific blocks in a particular order, the operations of the exemplary method and/or procedure can be performed in a different order than shown and can be combined and/or divided into blocks having different functionality than shown. Optional blocks or operations are indicated by dashed lines.

The exemplary method and/or procedure illustrated in FIG. 9 can include the operations of block 910, in which the network node can receive, from a domain name service (DNS) server, an address of a first node of the second RAT, wherein the first node of the second RAT is configured to act as an address request proxy for a plurality of nodes of the first RAT. In some embodiments, the address of the first node of the second RAT can be a transport network layer (TNL) address, for an X2 interface, that includes a fully qualified domain name (FQDN). The exemplary method and/or procedure can also include the operations of block 920, in which the network node can, based on the first address, establish a first connection with the first node of the second RAT. For example, blocks 910-920 can correspond to operations a)-b), respectively, shown in FIG. 8.

The exemplary method and/or procedure can also include the operations of block 950, in which the first node can receive a third request to setup a second connection with a second node of the second RAT. The exemplary method and/or procedure can also include the operations of block 960, in which the network node can send, to the second node of the second RAT, a fourth request for the second node to act as an address request proxy for the first node of the first RAT. In some embodiments, the exemplary method and/or procedure can also include the operations of block 970, in which the network node can receive, from the second node of the second RAT, a fourth response indicating that the second node will act as an address request proxy for the first node of the first RAT. In some embodiments, the fourth request can be included in a third response to the third request.

For example, blocks 950-970 can correspond to operations 9a-9c, respectively, in FIG. 8. As such, in some embodiments, the first and second connections can be X2 connections, the third request can be an X2 Setup Request message received from the second node of the second RAT, and the third response can be an X2 Setup Response message.

In some embodiments, the exemplary method and/or procedure can also include the operations of block 930-940, which can be performed before the operations of block 950. In block 930, the network node can receive, from the first node of the second RAT, a second request for an address of the first node of the first RAT. In block 940, the network node can send, to the first node of the second RAT, a second response including the requested address. For example, blocks 930-940 can correspond to operations 6a-6b, respectively, shown in FIG. 8.

In some embodiments, the fourth response (e.g., received in operation 9c) can include includes an address of the second node of the second RAT. In such embodiments, the exemplary method and/or procedure can also include the operations of blocks 980-990. In block 980, based on the address received in the fourth response, the network node can establish the second connection with the second node of the second RAT. In block 990, the network node can discard the first connection with the first node of the second RAT.

In some embodiments, the first RAT can be New Radio (NR) and the second RAT can be Long Term Evolution E-UTRA (LTE E-UTRA). In such embodiments, the first node of the first RAT can be an en-gNB and the first and second nodes of the second RAT can be eNBs.

Figure 10:
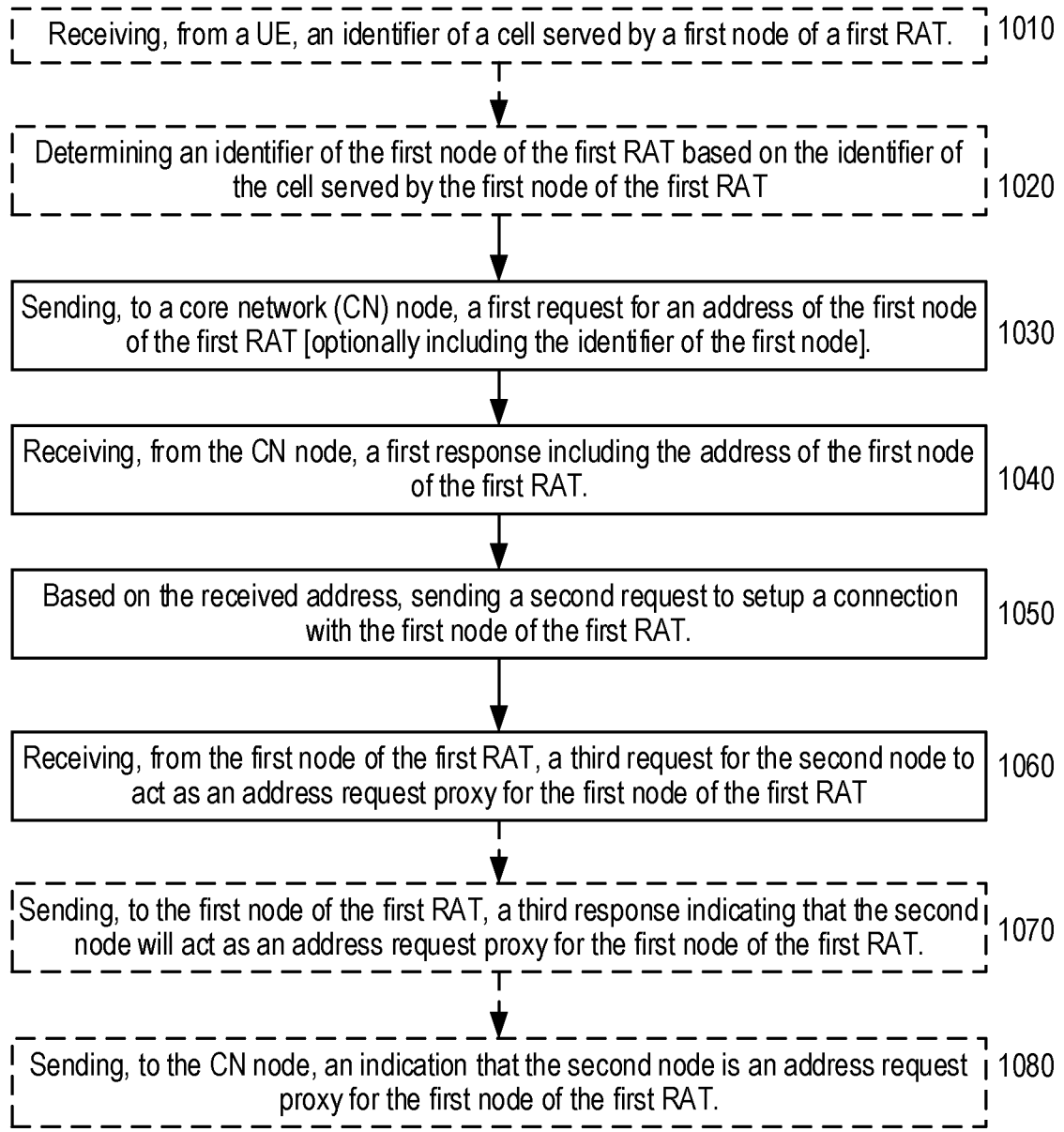

In addition, FIG. 10 is a flow diagram illustrating an exemplary method and/or procedure for a second node of a second radio access technology (RAT) in a radio access network (RAN), to configure dual-connectivity (DC) towards a user equipment (UE) with a first node of a first RAT in the RAN, according to various exemplary embodiments of the present disclosure. The exemplary method and/or procedure shown in FIG. 10 can be implemented, for example, by a network node (e.g., base station, eNB) of a second RAT in the RAN such as described in relation to, other figures herein. Furthermore, the exemplary method and/or procedure shown in FIG. 10 can be utilized cooperatively with other exemplary methods and/or procedures described herein (e.g., FIGS. 9 and/or 11) to provide various exemplary benefits described herein. Although FIG. 10 shows specific blocks in a particular order, the operations of the exemplary method and/or procedure can be performed in a different order than shown and can be combined and/or divided into blocks having different functionality than shown. Optional blocks or operations are indicated by dashed lines.

The exemplary method and/or procedure can include the operations of block 1030, in which the network node can send, to a core network (CN) node, a first request for an address of the first node of the first RAT. The exemplary method and/or procedure can also include the operations of block 1040, in which the network node can receive, from the CN node, a first response including the address of the first node of the first RAT. For example, blocks 1030-1040 can correspond to operations 3 and 8, respectively, in FIG. 8.

In some embodiments, the first request can include an identifier of the first node of the first RAT and an identifier of the second node. In such embodiments, the exemplary method and/or procedure can also include the operations of blocks 1010-1020. In block 1010, the network node can receive, from a UE, an identifier of a cell served by the first node of the first RAT. In block 1020, the network node can determine the identifier of the first node of the first RAT based on the identifier of the cell served by the first node of the first RAT. For example, blocks 1010-1020 can correspond to operations 1-2, respectively, in FIG. 8.

The exemplary method and/or procedure can also include the operations of block 1050, in which the network node can, based on the received address, send a third request to setup a connection with the first node of the first RAN. The exemplary method and/or procedure can also include the operations of block 1060, in which the network node can receive, from the first node of the first RAT, a fourth request for the second node to act as an address request proxy for the first node of the first RAT. In some embodiments, the exemplary method and/or procedure can also include the operations of block 1070, in which the network node can send, to the first node of the first RAT, a fourth response indicating that the second node will act as an address request proxy for the first node of the first RAT. In some embodiments, the fourth request can be included in a third response to the third request.

For example, blocks 1050-1070 can correspond to operations 9a-9c, respectively, shown in FIG. 8. As such, in some embodiments, the first and second connections can be X2 connections, the third request can be an X2 Setup Request message received from the second node of the second RAT, and the third response can be an X2 Setup Response message. In some embodiments, the address of the first node of the first RAT is a transport network layer (TNL) address for an X2 interface.

In some embodiments, the first RAT can be New Radio (NR) second RAT can be Long Term Evolution E-UTRA (LTE E-UTRA). In some embodiments, the first node of the first RAT can be an en-gNB and the first and second nodes of the second RAT can be eNBs.

Figure 11:
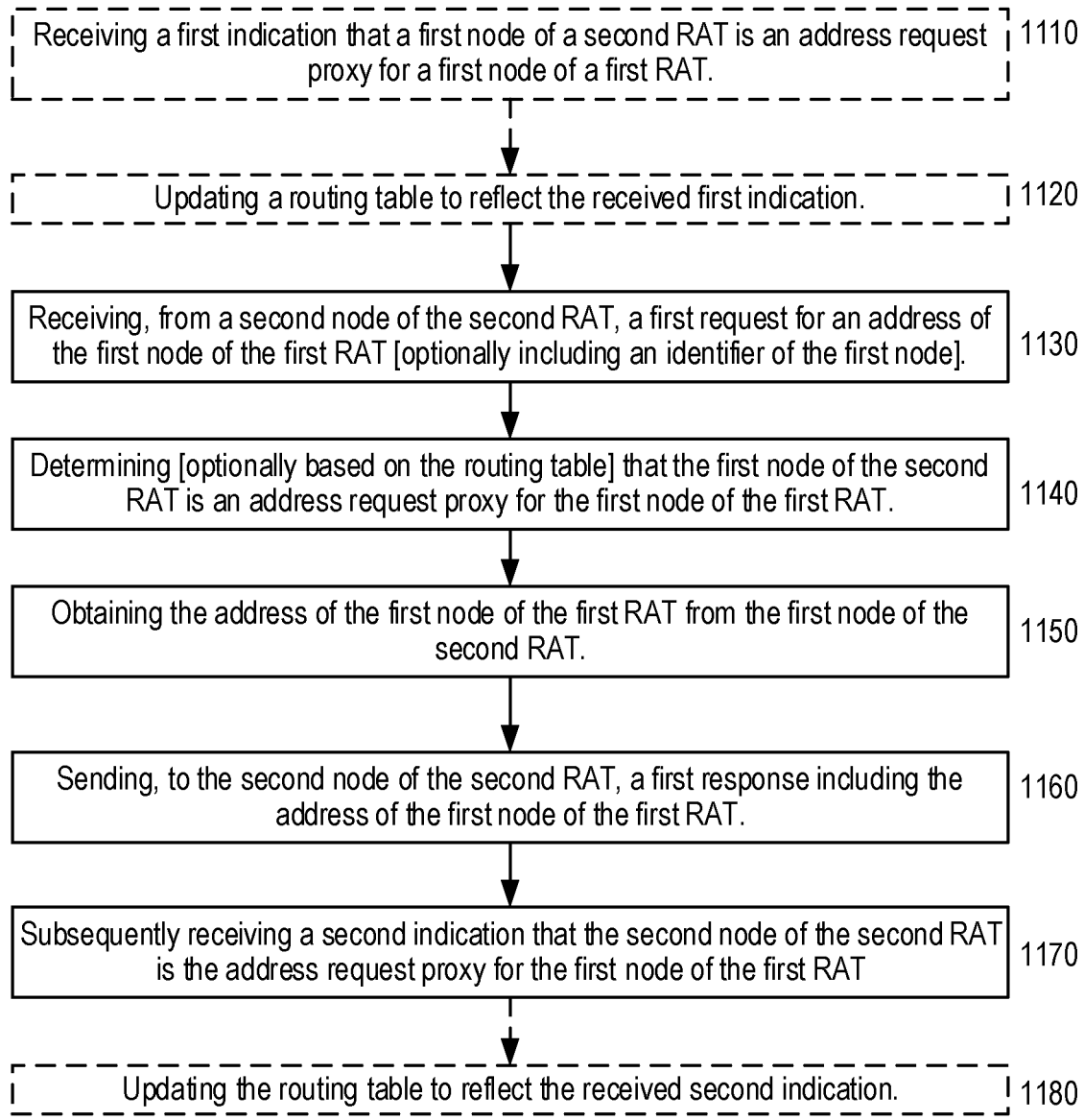
FIG. 11 is a flow diagram illustrating exemplary methods and/or procedures performed by network node (e.g., MME) in a core network (CN, e.g. EPC), according to various exemplary embodiments of the present disclosure.

In addition, FIG. 11 is a flow diagram illustrating an exemplary method and/or procedure for a core network (CN) node to facilitate dual connectivity (DC) of radio access network (RAN) nodes of different radio access technologies (RATs) towards user equipment (UE), according to various exemplary embodiments of the present disclosure. The exemplary method and/or procedure shown in FIG. 11 can be implemented, for example, by a network node (e.g., MIME) of a core network (CN, e.g., EPC) connected to a RAN having different RATs, such as described in relation to other figures herein. Furthermore, the exemplary method and/or procedure shown in FIG. 11 can be utilized cooperatively with other exemplary methods and/or procedures described herein (e.g., FIGS. 9-10) to provide various exemplary benefits described herein. Although FIG. 11 shows specific blocks in a particular order, the operations of the exemplary method and/or procedure can be performed in a different order than shown and can be combined and/or divided into blocks having different functionality than shown. Optional blocks or operations are indicated by dashed lines.

The exemplary method and/or procedure can include the operations of block 1130, in which the network node can receive, from a second node of a second RAT, a first request for an address of a first node of a first RAT. The exemplary method and/or procedure can also include the operations of block 1140, in which the network node can determine that a first node of the second RAT is an address request proxy for the first node of the first RAT. The exemplary method and/or procedure can also include the operations of block 1150, in which the network node can obtain the address of the first node in the first RAT from the first node of the second RAT. The exemplary method and/or procedure can also include the operations of block 1160, in which the network node can send, to the second node of the second RAT, a first response including the address of the first node of the first RAT. The exemplary method and/or procedure can also include the operations of block 1170, in which the network node can subsequently receive a second indication that the second node of the second RAT is the address request proxy for the first node of the first RAT.

For example, blocks 1130-1170 can correspond to operations 3-5 and 7 shown in FIG. 8. As such, in some embodiments, the first request can be an eNB Configuration Transfer message that includes an identifier of the first node of the first RAT and an identifier of the second node of the second RAT, and the first response can be an MME Configuration Transfer message.

In some embodiments, determining that the first node of the second RAT is an address request proxy for the first node of the first RAT (e.g., in block 1150) can be based on a routing table. In such embodiments, the exemplary method and/or procedure can also include the operations of block 1180, where the network node can update the routing table to reflect the received second indication. In such embodiments, the exemplary method and/or procedure can also include the operations of blocks 1110-1120, performed before the operations of block 1130. In block 1110, the network node can receive a first indication that the first node of the second RAT is an address request proxy for the first node of the first RAT. In block 1120, the network node can update the routing table to reflect the received first indication. For example, blocks 1110, 1120, and 1180 can correspond to operations c), d), and 11, respectively, shown in FIG. 8.

In some embodiments, the address of the first node of the first RAT is a transport network layer (TNL) address for an X2 interface. In some embodiments, the first RAT can be New Radio (NR) second RAT can be Long Term Evolution E-UTRA (LTE E-UTRA). In some embodiments, the first node of the first RAT can be an en-gNB and the first and second nodes of the second RAT can be eNBs.

Figure 12:
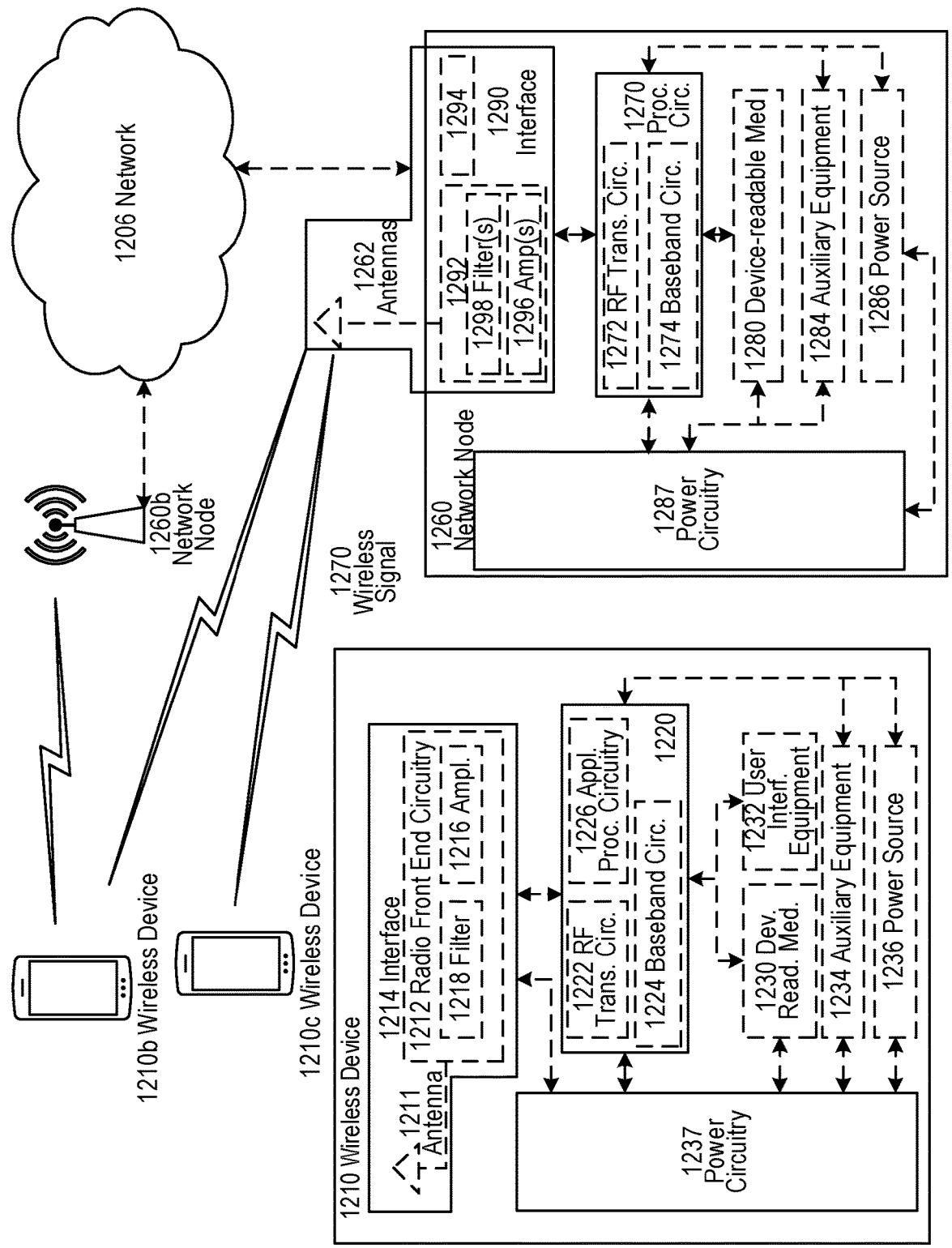
FIG. 12 illustrates an exemplary wireless network, according to various exemplary embodiments of the present disclosure.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Examples of network nodes include, but are not limited to, access points (APs) (e.g., radio access points) and base stations (BSs) (e.g., radio base stations, NBs, eNBs, and gNBs). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and an RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable to computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signaling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network to node 1260 and to allow output of information from network node 1260. This may allow a user to perform diagnostic, maintenance, repair, and other administrative functions for network node 1260.

In some embodiments, a wireless device (WD, e.g., WD 1210) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Other examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include to multiple sets of one or more of the illustrated components for different wireless technologies supported by WD 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210 and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, thereby allowing them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236.

Power circuitry 1237 may perform any formatting, converting, or other modification to the power from power source 1236 to make the power suitable for the respective components of WD 1210 to which power is supplied.

Figure 13:
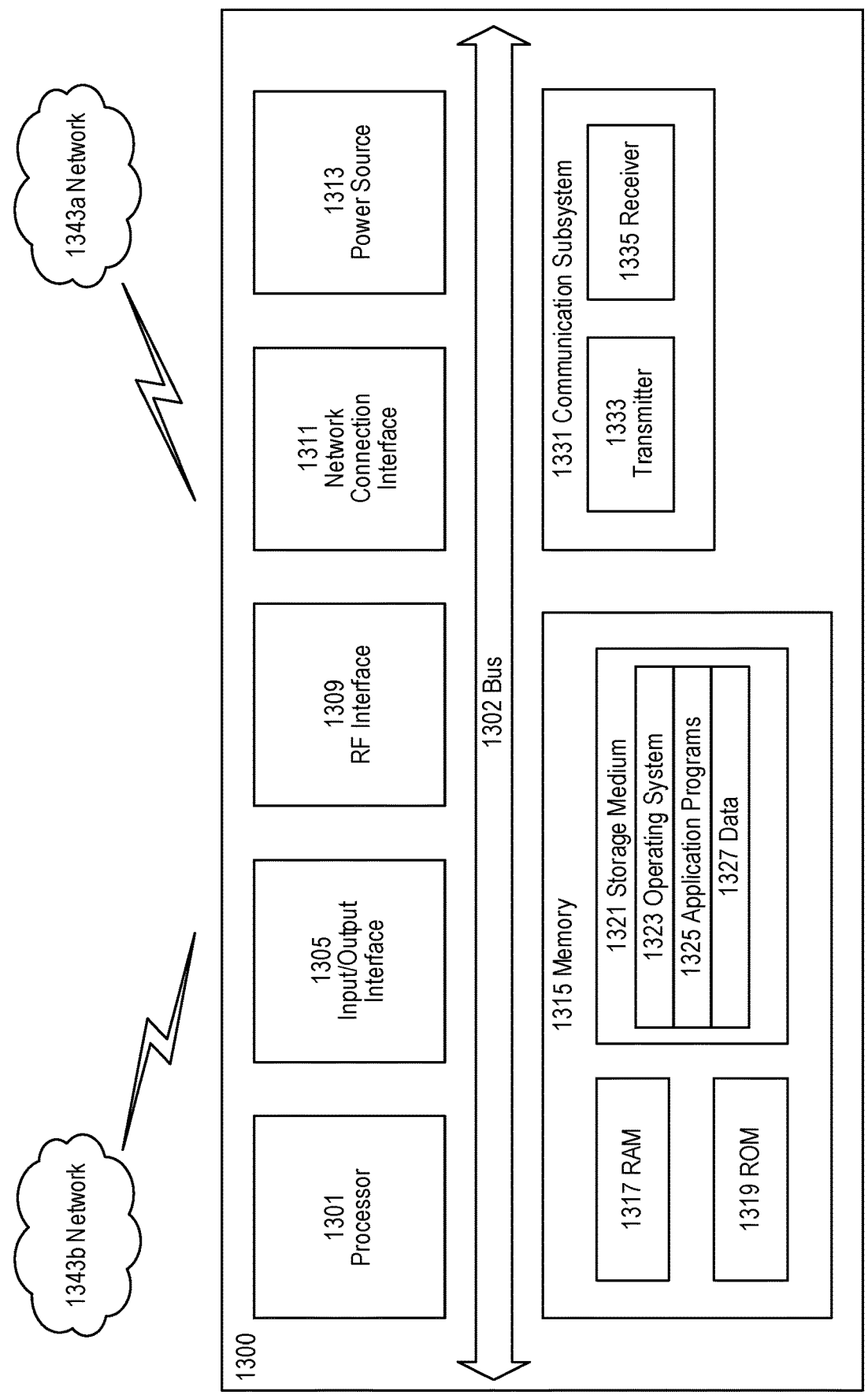
FIG. 13 illustrates an exemplary UE, according to various exemplary embodiments of the present disclosure.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343*b* using communication subsystem 1331. Network 1343*a* and network 1343*b* may be the same network or networks or different network or networks. Communication subsystem 1331 may be configured to include one or more transceivers used to communicate with network 1343*b*. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication sub system 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343*b* may encompass wired and/or wireless networks such as a local-area network (LAN), a wide-area network (WAN), a computer network, a wireless network, a telecommunications network, another like network or any combination thereof. For example, network 1343*b* may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
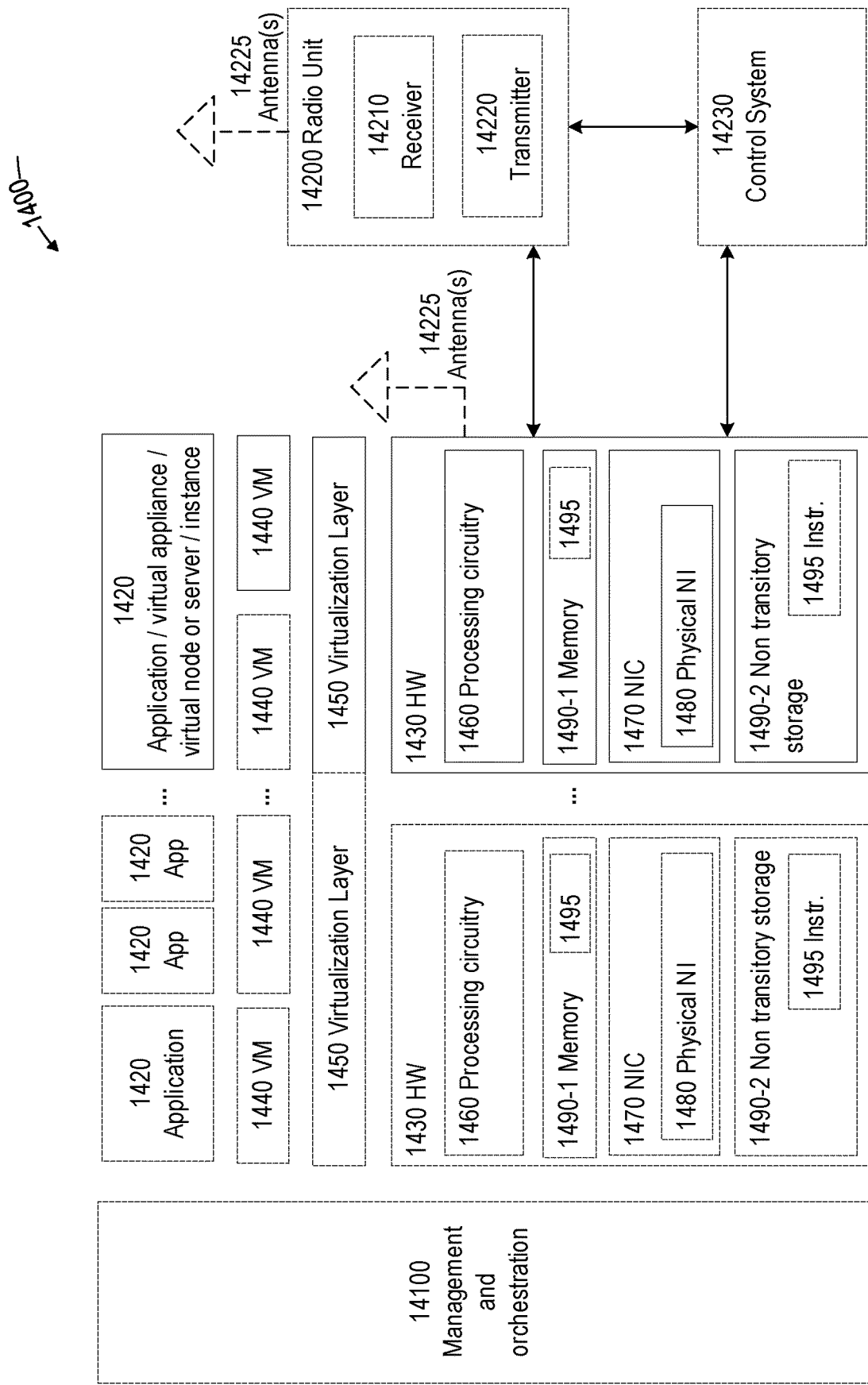
FIG. 14 is a block diagram illustrating an exemplary virtualization environment usable for implementing various exemplary embodiments of the present disclosure.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signaling can be performed by control system 14230, which may alternatively be used for communication between the hardware nodes 1430 and radio units 14200.

Figure 15:
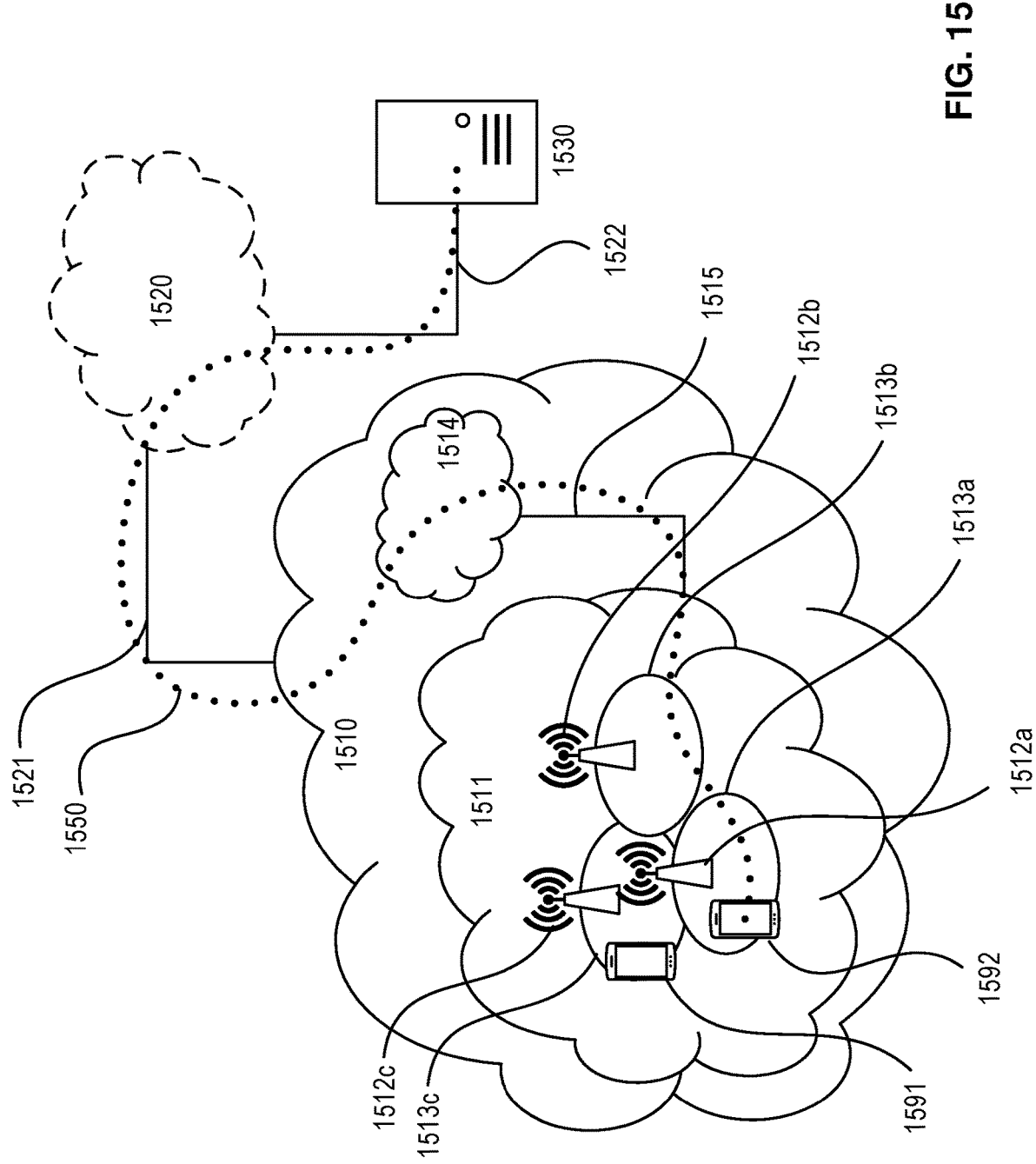
FIGS. 15-16 are block diagrams of exemplary communication systems and/or networks, according to various exemplary embodiments of the present disclosure.

FIG. 15 illustrates a telecommunication network connected via an intermediate network to a host computer in accordance with some embodiments. In particular, with reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
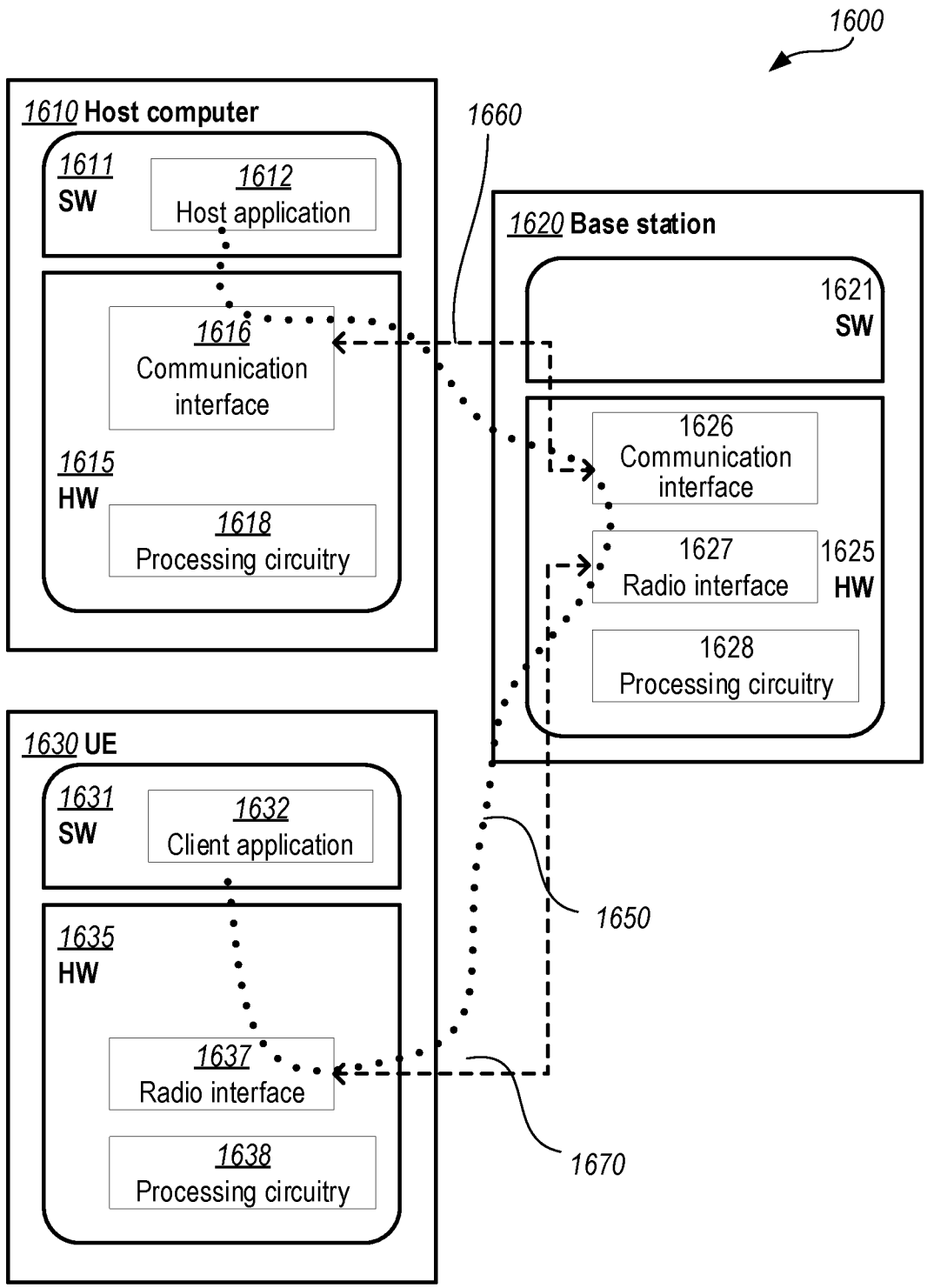

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct, or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 also includes UE 1630 (mentioned above), whose hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512a, 1512b, 1512c and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may improve the system performance when control channel resources overlap. This may in turn reduce control signaling transmission attempts and/or increase control signaling throughput and thereby provide benefits such as reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for configuring a first node of a first radio access technology (RAT) in a radio access network (RAN), for dual-connectivity (DC) toward a user equipment (UE) with nodes of a second RAT in the RAN, the method comprising:
receiving, from a domain name service (DNS) server, a first address of a first node of the second RAT, wherein the first node is one of a plurality of nodes of the second RAT that can act as DC configuration transfer proxies for nodes of the first RAT;
based on the first address, establishing a first connection with the first node of the second RAT;
receiving a request to establish a connection with a second node of the second RAT; and
sending, to the second node of the second RAT, a request for the second node to act as a DC configuration transfer proxy for the first node of the first RAT.

2. The method of embodiment 1, wherein the first address is a transport network layer (TNL) address for an X2 interface between the first node of the first RAT and the first node of the second RAT.

3. The method of any of embodiments 1-2, further comprising:
receiving, from the first node of the second RAT, a request for the first address; and
sending the first address to the first node of the second RAT.

4. The method of any of embodiments 1-3, further comprising receiving, from the second node, a response indicating that the second node will act as a DC configuration transfer proxy for the first node of the first RAT.

5. The method of any of embodiments 1-4, wherein the response further comprises a second address, and further comprising based on the second address:
establishing a second connection with the second node of the second RAT; and
discarding the first connection with the first node of the second RAT.

6. The method of embodiment 5, wherein the second address is a transport network layer (TNL) address for an X2 interface between the first node of the first RAT and the second node of the second RAT.

7. The method of any of embodiments 1-6, wherein the first RAT is New Radio (NR) second RAT is Long Term Evolution E-UTRA (LTE E-UTRA).

8. The method of any of embodiments 1-7, wherein the first node of the first RAT is an en-gNB and the first and second nodes of the second RAT are eNBs.

9. A method for a second node of a second radio access technology (RAT) in a radio access network (RAN), to configure dual-connectivity (DC) towards a user equipment (UE) with a first node of a first RAT in the RAN, the method comprising:
receiving, from the UE, a request comprising a first identifier of the first node of the first RAT;
sending, to a core network (CN) node, a request for a DC configuration proxy address associated with the first node of the first RAT, the request comprising:
a second identifier of the first node of the first RAT; and
a first identifier of the second node of the second RAT;

receiving, from the CN node, a response comprising a first address of the first node of the second RAT, wherein the first address is the requested DC configuration proxy address;

based on the first address, establishing a connection with the first node of the first RAT;

receiving, from the first node of the first RAT, a request for the second node of the second RAT to act as a DC configuration transfer proxy for the first node of the first RAT.

10. The method of embodiment 9, further comprising determining the second identifier of the first node of the first RAT based on the first identifier of the first node of the first RAT.

11. The method of any of embodiments 9-10, further comprising sending, to the first node of the first RAT, a response indicating that the second node will act as a DC configuration transfer proxy for the first node of the first RAT.

12. The method of any of embodiments 9-11, further comprising sending, to the CN node, a request to update a routing table entry, associated with the first node of the first RAT, from an identifier associated with the first node of the second RAT to an identifier associated with the second node of the second RAT.

13. The method of any of embodiments 9-12, wherein the first address is a transport network layer (TNL) address for an X2 interface between the first node of the first RAT and the first node of the second RAT.

14. The method of any of embodiments 9-13, wherein the first RAT is New Radio (NR) second RAT is Long Term Evolution E-UTRA (LTE E-UTRA).

15. The method of any of embodiments 9-14, wherein the first node of the first RAT is an en-gNB and the first and second nodes of the second RAT are eNBs.

16. A first node of a first radio access technology (RAT) in a radio access network (RAN), configured for dual-connectivity (DC) toward a user equipment (UE) with nodes of a second RAT in the RAN, the first node comprising:
one or more interfaces configured for communication with nodes of the second RAT, with a core network (CN), and with the UE; and
processing circuitry operably coupled to the communication interface and configured to perform any operations of any of embodiments 1-8; and
power supply circuitry configured to supply power to the first node.

17. A second node of a second radio access technology (RAT) in a radio access network (RAN) configured for dual-connectivity (DC) towards a user equipment (UE) with a first node of a first RAT in the RAN, the second node comprising:
one or more interfaces configured for communication with nodes of the first RAT, with a core network (CN), and with the UE; and
processing circuitry operably coupled to the communication interface and configured to perform any operations of any of embodiments 9-15; and
power supply circuitry configured to supply power to the second node.

18. A communication system including a host computer comprising:
processing circuitry configured to provide user data; and
a communication interface configured to forward the user data to a cellular network for transmission to a user equipment (UE); and a cellular network comprising a first base station having a radio interface and processing circuitry, the first base station's processing circuitry configured to perform any of the operations comprising embodiments 1-8.

19. The communication system of the previous embodiment, wherein the cellular network further comprises a second base station having a radio interface and processing circuitry, the second base station's processing circuitry configured to perform any of the to operations comprising embodiments 9-15.

20. The communication system of any of the previous two embodiments, further including the UE.

21. The communication system of any of the previous three embodiments, wherein:
the processing circuitry of the host computer is configured to execute a host application, thereby providing the user data; and
the UE comprises processing circuitry configured to execute a client application associated with the host application.

22. A method implemented in a communication system including a host computer, a first base station, and a User Equipment (UE), the method comprising:
at the host computer, providing user data; and
at the host computer, initiating a transmission carrying the user data to the UE via a cellular network comprising the base station;
at the first base station, performing operations corresponding to any of embodiments 1-8.

23. The method of the previous embodiment, further comprising, at the base station, transmitting the user data.

24. The method of any of the previous two embodiments, wherein the user data is provided at the host computer by executing a host application, the method further comprising, at the UE, executing a client application associated with the host application.

25. The method of any of the previous three embodiments, wherein the communication system further comprises a second base station, and wherein the method further comprises, at the second base station, performing operations corresponding to any of embodiments 9-15.

26. A communication system including a host computer comprising a communication interface configured to receive user data originating from a transmission from a User equipment (UE) to a first base station comprising a communication interface and processing circuitry, the first base station's processing circuitry is configured to perform operations of any of embodiments 1-8.

27. The communication system of the previous claims, wherein the communication interface is further configured to receive user data originating from a transmission from the UE to a second base station comprising a communication interface and processing circuitry, the second base station's processing circuitry is configured to perform operations of any of embodiments 9-15.

28. The communication system of the previous two embodiments, further including the UE, wherein the UE is configured to communicate with the first base station and/or the second base station.

29. The communication system of the previous three embodiments, wherein:
the processing circuitry of the host computer is configured to execute a host application; and
the UE is configured to execute a client application associated with the host application, thereby providing the user data to be received by the host computer.

30. A non-transitory, computer-readable medium storing computer-executable instructions that, when executed by a processing circuit comprising a base station, configure the base station to perform operations corresponding to any of embodiments 1-8.

31. A non-transitory, computer-readable medium storing computer-executable instructions that, when executed by a processing circuit comprising a base station, configure the base station to perform operations corresponding to any of embodiments 9-15.

The invention claimed is:

1. A method for configuring a first node of a first radio access technology (RAT) in a radio access network (RAN) for dual connectivity toward user equipment (UEs) with nodes of a second RAT in the RAN, the method comprising:
   receiving, from a domain name service (DNS) server, an address of a first node of the second RAT, wherein the first node of the second RAT is configured to act as an address request proxy for a plurality of nodes of the first RAT;
   based on the received address, establishing a first connection with the first node of the second RAT;
   receiving a third request to setup a second connection with a second node of the second RAT; and
   sending, to the second node of the second RAT, a fourth request for the second node to act as an address request proxy for the first node of the first RAT.

2. The method of claim 1, wherein the fourth request is included in a third response to the third request.

3. The method of claim 2, wherein:
   the first and second connections are X2 connections;
   the third request is an X2 Setup Request message received from the second node of the second RAT; and
   the third response is an X2 Setup Response message.

4. The method of claim 1, wherein the address of the first node of the second RAT is a transport network layer (TNL) address, for an X2 interface, that includes a fully qualified domain name (FQDN).

5. The method of claim 1, further comprising:
   receiving, from the first node of the second RAT, a second request for an address of the first node of the first RAT; and
   sending, to the first node of the second RAT, a second response including the requested address.

6. The method of claim 1, further comprising receiving, from the second node of the second RAT, a fourth response indicating that the second node will act as an address request proxy for the first node of the first RAT.

7. The method of claim 6, wherein:
   the fourth response includes an address of the second node of the second RAT; and the method further comprises:
      based on the address received in the fourth response, establishing the second connection with the second node of the second RAT; and
      discarding the first connection with the first node of the second RAT.

8. The method of claim 7, wherein the address of the second node of the second RAT is a transport network layer (TNL) address for an X2 interface.

9. The method of claim 1, wherein:
   the first RAT is New Radio (NR), and the first node of the first RAT is an en-gNB; and
   the second RAT is Long Term Evolution E-UTRA, and the first and second nodes of the second RAT are eNBs.

10. A network node, of a first radio access technology (RAT) in a radio access network (RAN), configured for dual connectivity toward user equipment (UEs) with nodes of a second RAT in the RAN, the network node comprising:
   interface circuitry operable to communicate with UEs and with other nodes in the RAN; and
   processing circuitry operably coupled to the interface circuitry, whereby the processing circuitry and the interface circuitry are configured to perform operations corresponding to the method of claim 1.

11. A method, for a second node of a second radio access technology (RAT) in a radio access network (RAN), to configure dual connectivity toward user equipment (UEs) with a first node of a first RAT in the RAN, the method comprising:
   sending, to a core network (CN) node, a first request for an address of the first node of the first RAT;
   receiving, from the CN node, a first response including the address of the first node of the first RAT;
   based on the received address, sending a third request to setup a connection with the first node of the first RAT; and
   receiving, from the first node of the first RAT, a fourth request for the second node to act as an address request proxy for the first node of the first RAT.

12. The method of claim 11, wherein:
   the first request includes an identifier of the first node of the first RAT and an identifier of the second node; and
   the method further comprises:
      receiving, from a UE, an identifier of a cell served by the first node of the first RAT; and
      determining the identifier of the first node of the first RAT based on the identifier of the cell served by the first node of the first RAT.

13. The method of claim 11, wherein the fourth request is included in a third response to the third request.

14. The method of claim 13, wherein:
   the connection is an X2 connection;
   the third request is an X2 Setup Request message sent to the first node of the first RAT; and
   the third response is an X2 Setup Response message.

15. The method of claim 11, further comprising sending, to the first node of the first RAT, a fourth response indicating that the second node will act as an address request proxy for the first node of the first RAT.

16. The method of claim 11, further comprising sending, to the CN node, an indication that the second node is an address request proxy for the first node of the first RAT.

17. The method of claim 11, wherein the address of the first node of the first RAT is a transport network layer (TNL) address for an X2 interface.

18. The method of claim 11, wherein:
   the first RAT is New Radio (NR), and the first node of the first RAT is an en-gNB; and
   the second RAT is Long Term Evolution E-UTRA, and the first and second nodes of the second RAT are eNBs.

19. A network node, of a second radio access technology (RAT) in a radio access network (RAN), configured for dual connectivity toward user equipment (UEs) with nodes of a first RAT in the RAN, the network node comprising:
   interface circuitry operable to communicate with UEs, with other nodes in the RAN, and with a core network (CN); and
   processing circuitry operably coupled to the interface circuitry, whereby the processing circuitry and the interface circuitry are configured to perform operations corresponding to the method of claim 11.

20. A method for a core network node to facilitate dual connectivity of radio access network nodes of different radio access technologies (RATs) towards user equipment (UEs), the method comprising:
- receiving, from a second node of a second RAT, a first request for an address of a first node of a first RAT;
- determining that a first node of the second RAT is an address request proxy for the first node of the first RAT;
- obtaining the address of the first node in the first RAT from the first node of the second RAT;
- sending, to the second node of the second RAT, a first response including the address of the first node of the first RAT; and
- subsequently receiving a second indication that the second node of the second RAT is the address request proxy for the first node of the first RAT.

21. The method of claim 20, wherein:
- determining that the first node of the second RAT is an address request proxy for the first node of the first RAT is based on a routing table; and
- the method further comprises updating the routing table to reflect the received second indication.

22. A network node, of a core network, configured to facilitate dual connectivity of radio access network (RAN) nodes having different radio access technologies (RATs) towards user equipment (UEs), the network node comprising:
- interface circuitry operable to communicate with the RAN nodes; and
- processing circuitry operably coupled to the interface circuitry, whereby the processing circuitry and the interface circuitry are configured to perform operations corresponding to the method of claim 20.

* * * * *

UNITED STATES PATENT AND TRADEMARK OFFICE
CERTIFICATE OF CORRECTION

PATENT NO. : 11,838,967 B2
APPLICATION NO. : 17/276988
DATED : December 5, 2023
INVENTOR(S) : Popescu et al.

It is certified that error appears in the above-identified patent and that said Letters Patent is hereby corrected as shown below:

In the Drawings

In Fig. 8, Sheet 8 of 17, for Tag "730", Line 1, delete "eNB$_2$" and insert -- eNB$_1$ --, therefor.

In Fig. 12, Sheet 12 of 17, for Tag "1274", Line 1, delete "Baseband Circ." and insert -- Baseband Processing Circ. --, therefor.

In Fig. 12, Sheet 12 of 17, for Tag "1224", Line 1, delete "Baseband Circ." and insert -- Baseband Processing Circ. --, therefor.

In the Specification

In Column 2, Line 12, delete "RR_CONNECTED" and insert -- RRC_CONNECTED --, therefor.

In Column 4, Line 11, delete "NW"." and insert -- NR". --, therefor.

In Column 9, Line 34, delete "network (5GC)," and insert -- (5GC) network, --, therefor.

In Column 9, Line 49, delete "both from" and insert -- both --, therefor.

In Column 9, Line 65, delete "such the" and insert -- such as the --, therefor.

In Column 10, Line 13, delete "3 GPP" and insert -- 3GPP --, therefor.

In Column 10, Line 40, delete "also before" and insert -- before --, therefor.

In Column 11, Line 33, delete "FIG. 7 in" and insert -- FIG. 7 --, therefor.

In Column 11, Line 58, delete "to this" and insert -- to the --, therefor.

Signed and Sealed this
Twenty-first Day of May, 2024

Katherine Kelly Vidal
*Director of the United States Patent and Trademark Office*

CERTIFICATE OF CORRECTION (continued)
U.S. Pat. No. 11,838,967 B2

In Column 12, Line 18, delete "WE" and insert -- MME --, therefor.

In Column 12, Line 42, delete "to be configured" and insert -- be configured --, therefor.

In Column 13, Line 4, delete "is a suitable" and insert -- is suitable --, therefor.

In Column 13, Line 61, delete "UE served" and insert -- UE is served --, therefor.

In Column 15, Line 13, delete "shown in" and insert -- as shown in --, therefor.

In Column 15, Line 48, delete "include includes" and insert -- include --, therefor.

In Column 17, Line 6, delete "MIME)" and insert -- MME) --, therefor.

In Column 19, Line 44, delete "NodeB's." and insert -- NodeBs. --, therefor.

In Column 20, Line 8, delete "to computing" and insert -- computing --, therefor.

In Column 22, Line 31, delete "to node 1260" and insert -- node 1260 --, therefor.

In Column 22, Line 65, delete "narror band internet of things" and insert -- narrowband Internet of Things --, therefor.

In Column 23, Line 16, delete "include to" and insert -- include --, therefor.

In Column 28, Line 5, delete "(SIM/RUIM) module," and insert -- module (SIM/RUIM), --, therefor.

In Column 28, Line 35, delete "sub system" and insert -- subsystem --, therefor.

In Column 33, Line 39, delete "etc.; the" and insert -- etc. The --, therefor.

In Column 35, Line 28, delete "according" and insert -- according to --, therefor.

In Column 35, Line 63, delete "that there" and insert -- there --, therefor.

In Column 38, Line 9, delete "to operations" and insert -- operations --, therefor.